United States Patent
Liu et al.

(10) Patent No.: US 7,263,050 B2
(45) Date of Patent: Aug. 28, 2007

(54) METHODS AND SYSTEMS FOR TUNING WRITE STRATEGY PARAMETERS OF AN OPTICAL STORAGE DEVICE

(75) Inventors: Pi-Hai Liu, Taipei (TW); Yuh Cheng, Ju-Bei (TW); Chih-Ching Yu, Tao-Yuan Hsien (TW); Chih-Hsiung Chu, Taipei Hsien (TW)

(73) Assignee: Mediatek Inc., Science-Based Industrial Park, Hsin-Chu Hsien (TW)

( * ) Notice: Subject to any disclaimer, the term of this patent is extended or adjusted under 35 U.S.C. 154(b) by 15 days.

(21) Appl. No.: 11/306,115

(22) Filed: Dec. 16, 2005

(65) Prior Publication Data

US 2006/0215524 A1 Sep. 28, 2006

Related U.S. Application Data

(63) Continuation-in-part of application No. 10/906,397, filed on Feb. 17, 2005, now Pat. No. 7,006,420.

(51) Int. Cl.
  *G11B 7/00* (2006.01)
(52) U.S. Cl. .............. 369/59.12; 369/47.5; 369/116
(58) Field of Classification Search .......... 369/59.11, 369/59.12, 100, 44.13, 59.25, 59.2, 275.1, 369/275.2, 275.3, 275.4, 275.5, 53.26, 47.5, 369/47.53, 47.26
See application file for complete search history.

(56) References Cited

U.S. PATENT DOCUMENTS

| | | | |
|---|---|---|---|
| 6,188,658 B1 * | 2/2001 | Saga et al. ............. | 369/47.51 |
| 6,388,970 B1 * | 5/2002 | Iizuka .................. | 369/59.12 |
| 6,574,178 B2 * | 6/2003 | Tieke et al. ............ | 369/59.11 |
| 6,631,110 B1 * | 10/2003 | Seo et al. ............... | 369/59.12 |
| 6,762,985 B2 * | 7/2004 | Furukawa et al. ....... | 369/59.11 |
| 6,819,644 B2 * | 11/2004 | Sasaki et al. ........... | 369/59.12 |

* cited by examiner

*Primary Examiner*—Ali Neyzari
(74) *Attorney, Agent, or Firm*—Winston Hsu

(57) ABSTRACT

A system, for tuning a plurality of write strategy parameters of an optical storage device, includes: a run-length limited (RLL) meter for detecting a plurality of lengths, each length corresponding to a pit or a land on an optical storage medium accessed by the optical storage device; and a calculation module coupled to the RLL meter for performing calculations according to the lengths to generate a plurality of calculation results; wherein the write strategy parameters are tuned according to the calculation results.

21 Claims, 14 Drawing Sheets

METHODS AND SYSTEMS FOR TUNING WRITE STRATEGY PARAMETERS OF AN OPTICAL STORAGE DEVICE

CROSS REFERENCE TO RELATED APPLICATIONS

This application is a continuation-in-part application and claims the benefit of U.S. application Ser. No. 10/906,397, which was filed on Feb. 17, 2005 and entitled "METHOD FOR TUNING WRITE STRATEGY PARAMETERS OF AN OPTICAL STORAGE DEVICE, AND SYSTEM THEREOF".

BACKGROUND

The present invention relates to write strategy tuning of an optical storage device, and more particularly, to methods and a systems for tuning write strategy parameters of an optical storage device.

As multimedia applications progress prosperously, the demand for storing massive digital data increases rapidly. As a result, high storage volume and compact size optical storage media such as CD-R discs and DVD±R discs become more and more popular, and an optical storage device such as a CD drive or a DVD drive becomes a standard accessory of a personal computer utilized for performing the multimedia applications mentioned above.

Take the CD drive as an example. When the CD drive is controlled to write data to a CD-R disc, the writing power of a Laser Diode in the CD drive is usually set to be a specific value and writing pulses corresponding to the data are utilized for recording pits and lands onto the grooves of a CD-R disc. The specific value for the writing power can be derived from an optimal power calibration (OPC) process. On the other hand, through a write strategy tuning process, which is also referred to as a recording strategy tuning process, changing write strategy parameters for controlling widths of the writing pulses may increase the accuracy of lengths of the pits and the lands formed on the CD-R disc. Please refer to related documents of the CD-R specifications (e.g. the Orange Book Part I) for more information.

According to the related art, a specific device such as an oscilloscope can be utilized during the write strategy tuning process. Usually, an engineer or a researcher should determine, by experience, a new set of write strategy parameters for controlling the widths of the writing pulses according to an eye pattern of a plurality of reproduced waveforms shown on the oscilloscope after a trial writing process in advance. It takes lots of time of the engineer or the researcher to utilize this method since repeatedly performing the same process, including at least writing test data, watching an eye pattern of reproduced waveforms shown on the oscilloscope and determining a new set of write strategy parameters by experience according to the eye pattern, is required for each different kind of applicable media and for each different recording speed. The write strategy tuning process mentioned above is time consuming since watching eye patterns to determine write strategy parameters is not automatic. In addition, the write strategy tuning process mentioned above is implicit since determining a new set of write strategy parameters by experience according to the eye pattern is not quantitative. Under certain situations, an unclear eye pattern would invalidate or interfere the write strategy tuning process.

A specific instrument such as a time interval analyzer (TIA) or a jitter meter might be helpful for the same purpose of deriving information for determining a new set of write strategy parameters. However, similar routine work is also required, and if the TIA or the jitter meter is simply coupled for measuring without setting up an additional control system, the same problem that the write strategy tuning process is not automatic still exists. In addition, the information derived from the specific instrument is usually implicit and therefore takes up lots of an experienced engineer or researcher's time.

SUMMARY

Methods and systems for tuning a plurality of write strategy parameters of an optical storage device are provided. Some embodiments of a method for tuning write strategy parameters of an optical storage device comprise: detecting a plurality of lengths, each length corresponding to a pit or a land on an optical storage medium accessed by the optical storage device; performing calculations according to the lengths and data types to generate calculation results which respectively correspond to the data types, where each of the data types corresponds to at least a specific target pit length or at least a specific target land length; and utilizing the calculation results for tuning the write strategy parameters respectively corresponding to the data types.

Some embodiments of a system for tuning a plurality of write strategy parameters of an optical storage device comprise: a detector for detecting a plurality of lengths, each length corresponding to a pit or a land on an optical storage medium accessed by the optical storage device; a calculation module coupled to the detector for performing calculations according to the lengths and data types to generate calculation results which respectively correspond to the data types, where each of the data types corresponds to at least a specific target pit length or at least a specific target land length; and a controller coupled to the detector and the calculation module, the controller utilizing the calculation results for tuning the write strategy parameters respectively corresponding to the data types.

In some exemplary embodiments of a write strategy parameter tuning method, the write strategy parameters comprise one or more power levels for accessing the optical storage medium.

In some exemplary embodiments of a write strategy parameters tuning method, the write strategy parameters comprise an overdrive (OD) width or edge delay of at least one write pulse corresponding to one of the data types.

Some embodiments of a method for tuning a plurality of write strategy parameters of an optical storage device comprise: detecting a plurality of lengths, each length corresponding to a pit or a land on an optical storage medium accessed by the optical storage device; performing calculations according to the lengths and a plurality of data set types to generate a plurality of calculation results respectively corresponding to the data set types, each of the data set types corresponding to a combination of at least a specific target pit length and a specific target land length or a combination of at least a specific target land length and a specific target pit length, the combination corresponding to a specific write strategy parameter; and utilizing the calculation results for tuning the write strategy parameters respectively corresponding to the data set types, the write strategy parameters comprising an OD width or edge delay of at least one write pulse corresponding to one of the data set types.

Some embodiments of a method for tuning a plurality of write strategy parameters of an optical storage device comprise: detecting a plurality of lengths comprising pit lengths and land lengths, each pit length corresponding to a pit on an optical storage medium accessed by the optical storage device, each land length corresponding to a land on the optical storage medium; performing calculations on the pit lengths and the land lengths to generate calculation results; and utilizing the calculation results for tuning the write strategy parameters comprising at least one power level, whereby an average power-value is substantially kept constant or within a specific range.

Some exemplary embodiments of a system for tuning a plurality of write strategy parameters of an optical storage device comprise: a run-length limited (RLL) meter for detecting a plurality of lengths, each length corresponding to a pit or a land on an optical storage medium accessed by the optical storage device; and a calculation module coupled to the RLL meter for performing calculations according to the lengths to generate a plurality of calculation results; wherein the write strategy parameters are tuned according to the calculation results.

These and other objectives of the present invention will no doubt become obvious to those of ordinary skill in the art after reading the following detailed description of the preferred embodiment that is illustrated in the various figures and drawings.

DETAILED DESCRIPTION

The present invention provides methods and systems for tuning a plurality of write strategy parameters of an optical storage device. According to an aspect, the system is a circuit for tuning the write strategy parameters, where the circuit is positioned in the optical storage device. According to another aspect, the system is substantially the optical storage device itself. According to another aspect, the system comprises a combination of a computer and an optical storage device. Various aspects are explained herein according to different embodiments of the present invention.

Figure 1:
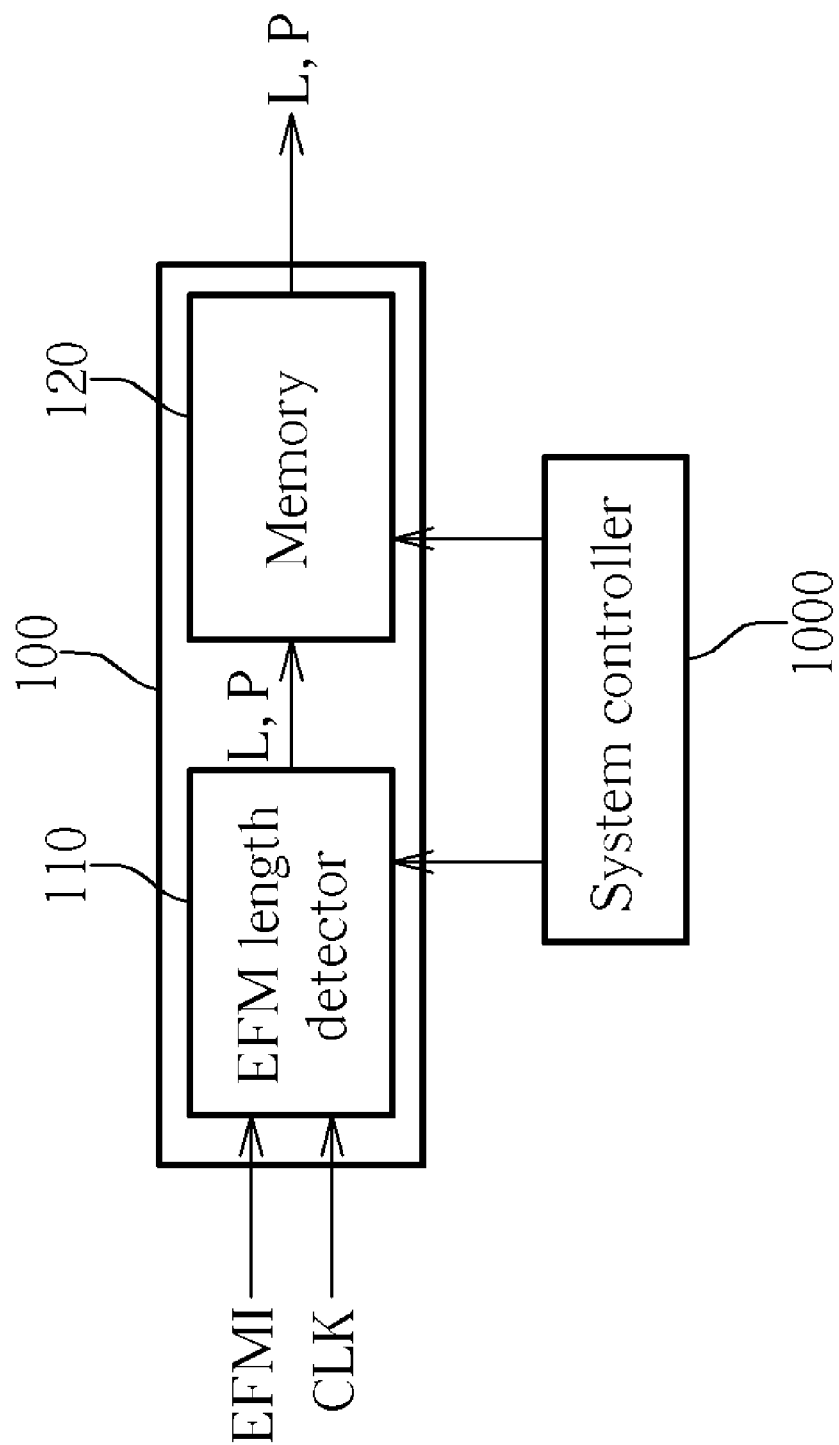
FIG. 1 is a diagram of a combination of a system controller and an eight-to-fourteen modulation (EFM) length measurement device according to an embodiment of the present invention.

Please refer to FIG. 1. FIG. 1 illustrates a diagram of a system controller 1000 coupled to an eight-to-fourteen modulation (EFM) length measurement device 100 according to a first embodiment of the present invention. The EFM length measurement device 100 is usually coupled to a slicer (not shown) of an optical storage device such as a CD drive. The slicer is capable of generating a sliced signal such as EFMI shown in FIG. 1 according to a reproduced signal such as a so-called RF signal representing data written on an optical storage medium. Operation and principles of the slicer is well known in the art and will not be described repeatedly here. Please note that for simplicity, this embodiment is described utilizing the CD-R disc as the optical storage medium and utilizing the CD drive as the optical storage device. Those skilled in the art should understand that other kinds of optical storage media such as a DVD±R disc and corresponding optical storage devices such as a DVD drive are applicable according to other embodiments of the present invention.

As shown in FIG. 1, the EFM length measurement device 100 includes an EFM length detector 110 and a memory 120. The EFM length detector 110 is capable of detecting lengths according to the sliced signal EFMI carrying the data recorded on the optical storage medium. The EFM length detector 110 typically detects intervals between rising edges and falling edges of the sliced signal as the lengths. Each interval corresponds to a pit or a land on the optical storage medium. As a result, the lengths mentioned above include pit lengths and land lengths. According to this embodiment, the sliced signal EFMI has EFM information. Each of the pit lengths mentioned above represents a pit recorded along a groove on the optical storage medium, and each of the land lengths mentioned above represents a land along the groove. Please note that the sliced signal of another embodiment of the present invention may have EFM plus (EFM+) information (e.g. for an embodiment of DVD-R) or other information complying with a variation of the EFM/EFM+ specification.

In the first embodiment, the pit lengths and the land lengths derived from the sliced signal EFMI have lengths ranging from 3T to 11T in an ideal case of the CD-R disc, wherein T represents a period of an EFM data clock. That is, a length P of a pit or a length L of a land can be 3T, 4T, . . . , or 11T. So it is reasonable that the reference clock CLK, which is a reference signal for measuring the lengths of the pits and the lands, has a period less than or equal to the period T of the EFM data clock. According to this embodiment, the period of the reference clock CLK is T/10. In a real case of the CD-R disc, the lengths L and P are usually not exact multiples of T. The memory 120 stores the lengths L and P detected by the EFM length detector 110 and outputs the lengths L and P as requested by the system controller 1000. Then a computer, which can be coupled to the optical storage device and executes an application program, or a micro-processing unit (MPU) executing a firmware code in the optical storage device may perform calculations according to the lengths L and P outputted from the memory 120 to generate calculation results for tuning a plurality of write strategy parameters of the optical storage device.

It is noted that no matter the computer or the MPU is utilized for performing the calculations, the write strategy parameters can be tuned automatically according to the lengths since the specific device (e.g. the oscilloscope mentioned above) is no longer required according to the present invention. In addition, if the computer is not utilized for performing the calculations, the write strategy parameters can be tuned automatically on system or on chip according to the present invention.

In the case that the computer executing the application program performs the calculations mentioned above to generate the calculation results for tuning the write strategy parameters, it is obvious that the computer executing the application program may send the calculation results back to the optical storage device, so the computer executing the application program or the MPU executing the firmware code may tune the write strategy parameters according to the calculation results. On the other hand, in the case that the MPU executing the firmware code performs the calculations mentioned above to generate the calculation results for tuning the write strategy parameters, the MPU may simply tune the write strategy parameters according to the calculation results generated by the MPU. Through tuning the write strategy parameters according to the calculation results derived from the lengths L and P, pit lengths or land lengths corresponding to data newly written on the optical storage medium utilizing the latest values of the write strategy parameters may approach multiples of T. Please note, as long as the implementation of the present invention is not hindered, the system controller 1000 can be the MPU executing the firmware code according to a variation of the first embodiment.

Figure 2:
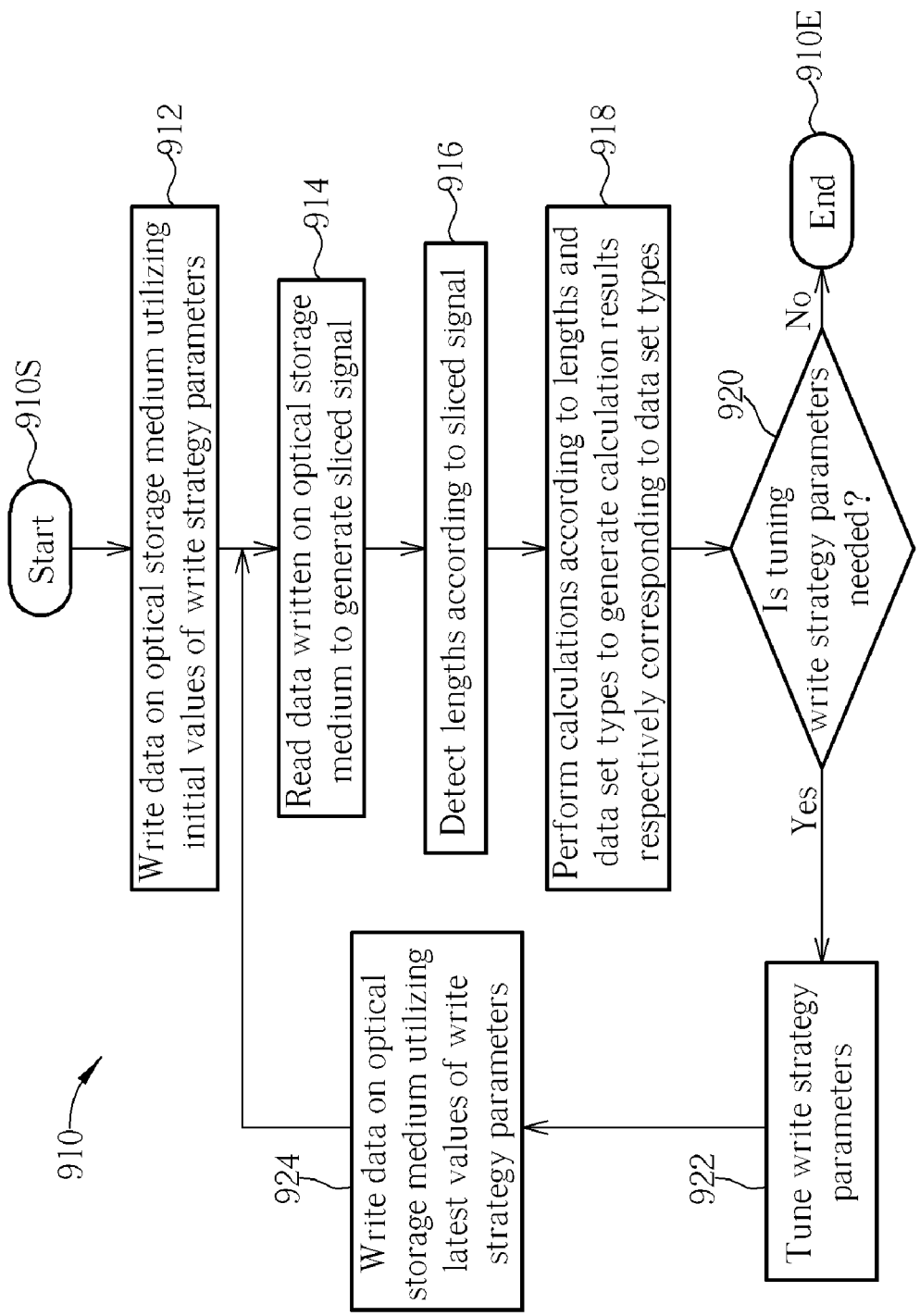
FIG. 2 is a flowchart of a method for tuning write strategy parameters of an optical storage device according to an embodiment of the present invention.

FIG. 2 illustrates a flowchart of a method 910 for tuning write strategy parameters of an optical storage device according to an embodiment of the present invention. Applying the method 910 utilizing the system shown in FIG. 1, the first embodiment can be described as follows according to the case that the MPU performs the calculations mentioned above.

In Step 912, under the control of the MPU (not shown) of the optical storage device, the optical storage device writes data on the optical storage medium utilizing initial values of the write strategy parameters corresponding to a specific value of the rotational speed of the optical storage device.

In Step 914, the optical storage device reads the data newly written on the optical storage medium to generate the sliced signal EFMI.

In Step 916, the EFM length detector 110 of the EFM length measurement device 100 detects lengths P of pits and lengths L of lands, respectively, according to the sliced signal EFMI.

In Step 918, the MPU executing the firmware code performs the calculations according to the lengths L and P detected in Step 916 and data set types $(L_{nT}, P_{mT})$ and $(P_{nT}, L_{mT})$ to generate the calculation results respectively corresponding to the data set types $(L_{nT}, P_{mT})$ and $(P_{nT}, L_{mT})$, where n=3, 4, . . . , 11 and m=3, 4, . . . , 11. Each of the data set types $(L_{nT}, P_{mT})$, e.g. a data set type $(L_{n0*T}, P_{m0*T})$ having n=n0 and m=m0, is utilized for classifying data sets (L, P) corresponding to a land having a target land length of n0*T followed by an adjacent pit having a target pit length of m0*T. In this embodiment, the data sets (L, P) are also referred to as the length sets (L, P). Similarly, each of the data set types $(P_{nT}, L_{mT})$, e.g. a data set type $(P_{n0*T}, L_{m0*T})$ having n=n0 and m=m0, is utilized for classifying data sets (P, L) corresponding to a pit having a target pit length of n0*T followed by an adjacent land having a target land length of m0*T. In this embodiment, the data sets (P, L) are also referred to as the length sets (P, L). It is noted that each of the data set types $(L_{nT}, P_{mT})$, e.g. the data set type $(L_{n0*T}, P_{m0*T})$, corresponds to a combination (n0*T, m0 *T) of a specific target land length n0*T and a specific target pit length m0*T, and each of the data set types $(P_{nT}, L_{mT})$, e.g. the data set type $(P_{n0*T}, L_{m0*T})$, corresponds to a combination (n0*T, m0*T) of a specific target pit length n0*T and a specific target land length m0*T. As a result, the number of data set types $(L_{nT}, P_{mT})$ and $(P_{nT}, L_{mT})$ can be derived as follows:

$$9*9*2=162$$

The MPU may classify the data sets (L, P) to be of the data set type $(L_{n0*T}, P_{m0*T})$ if $$(n0-0.5)*T \leq L \leq (n0+0.5)*T \text{ and } (m0-0.5)*T \leq P \leq (m0+0.5)*T.$$

Similarly, the MPU may classify the data sets (P, L) to be of the data set type $(P_{n0*T}, L_{m0*T})$ if $$(n0-0.5)*T \leq P \leq (n0+0.5)*T \text{ and } (m0-0.5)*T \leq L \leq (m0+0.5)*T.$$

After deriving the number of data sets (L, P) corresponding to each of the data set types $(L_{nT}, P_{mT})$ and the number of data sets (P, L) corresponding to each of the data set types $(P_{nT}, L_{mT})$, the MPU calculates average length sets $(\underline{L}_{nT}, \underline{P}_{mT})$ corresponding to the data set types $(L_{nT}, P_{mT})$ respectively, and calculates average length sets $(\underline{P}_{nT}, \underline{L}_{mT})$ corresponding to the data set types $(P_{nT}, L_{mT})$ respectively, where the average lengths $\underline{L}_{nT}$ and $\underline{P}_{mT}$ respectively represent the average values of the lengths L and P of the data set types $(L_{nT}, P_{mT})$, and the average lengths $\underline{P}_{nT}$ and $\underline{L}_{mT}$ respectively represent the average values of the lengths P and L of the data set types $(P_{nT}, L_{mT})$. For example, the average lengths $\underline{L}_{n0*T}$ and $\underline{P}_{m0*T}$ respectively represent the average values of the lengths L and P of the data set type $(L_{n0*T}, P_{m0*T})$, and the average lengths $\underline{P}_{n0*T}$ and $\underline{L}_{m0*T}$ respectively represent the average values of the lengths P and L of the data set type $(P_{n0*T}, L_{m0*T})$.

After calculating the average length sets $(\underline{L}_{nT}, \underline{P}_{mT})$, the calculation results $(\Delta \underline{L}_{nT}, \Delta \underline{P}_{mT})$ corresponding to the data set types $(L_{nT}, P_{mT})$ can be derived respectively from the following equations:

$$\Delta \underline{L}_{nT} = \underline{L}_{nT} - nT$$

$$\Delta \underline{P}_{mT} = \underline{P}_{mT} - mT$$

Similarly, after calculating the average length sets $(\underline{P}_{nT}, \underline{L}_{mT})$, the calculation results $(\Delta \underline{P}_{nT}, \Delta \underline{L}_{mT})$ corresponding to the data set types $(P_{nT}, L_{mT})$, respectively, can be derived from the following equations:

$$\Delta \underline{P}_{nT} = \underline{P}_{nT} - nT$$

$$\Delta \underline{L}_{mT} = \underline{L}_{mT} - mT$$

In Step 920, the MPU executing the firmware code determines if tuning the write strategy parameters is needed. If any of the length deviation values $\Delta L_{nT}$, $\Delta P_{mT}$, $\Delta P_{nT}$, or $\Delta L_{mT}$ of the calculation results ($\Delta L_{nT}$, $\Delta P_{mT}$) and ($\Delta P_{nT}$, $\Delta L_{mT}$) is greater than a specific threshold, the MPU executing the firmware code determines that tuning the write strategy parameters is needed, so Step 922 will be executed; otherwise, enter Step 910E. Please note, for the first time of executing Step 920, the MPU may determine to enter Step 922 directly without any consideration if the initial values of the write strategy parameters are sure to be imperfect. In addition, although the write strategy parameters described in Step 920 and 922 are plural for simplicity as shown in FIG. 2, this is not a limitation of the present invention. Both Step 920 and 922 can be described utilizing a singular form of "write strategy parameter" if tuning only a single write strategy parameter is needed. Repeated explanation of the singular or plural form for similar situations is therefore unnecessary in the following.

If determining to enter Step 922, the MPU executing the firmware code then tunes the write strategy parameters according to calculation results ($\Delta L_{nT}$, $\Delta P_{mT}$) and ($\Delta P_{nT}$, $\Delta L_{mT}$), respectively. According to this embodiment, the write strategy parameters include $F_{i,k}$ and $R_{j,k}$ for controlling beginning locations of the pits and the lands, respectively, where $i=0, 1, \ldots, 80$ corresponding to all the data set types ($L_{nT}$, $P_{mT}$), $j=0, 1, \ldots, 80$ corresponding to all the data set types ($P_{nT}$, $L_{mT}$), and k is a loop index corresponding to the number of times for write strategy tuning (i.e. tuning the write strategy parameters). In this embodiment, $F_{i,0}$ and $R_{j,0}$ represent the initial values of the write strategy parameters corresponding to the combination indexes i and j, respectively, and $F_{i,1}$ and $R_{j,1}$ represent latest values of the write strategy parameters corresponding to the combination indexes i and j at the first time that Step 922 is executed for the combination indexes i and j, respectively. Accordingly, $F_{i,k}$ and $R_{j,k}$ represent latest values of the write strategy parameters corresponding to the combination indexes i and j at the $k^{th}$ time that Step 922 is executed for the combination indexes i and j, respectively.

Please note that the number of data set types ($L_{nT}$, $P_{mT}$) and ($P_{nT}$, $L_{mT}$) according to another embodiment implemented for the DVD±R disc mentioned above can be derived as follows:

$$10*10*2=200;$$

since $n=3, 4, \ldots, 11, 14$ and $m=3, 4, \ldots, 11, 14$ for the DVD±R disc. In addition, as long as the implementation of the present invention is not hindered, not all the average length sets mentioned above should be calculated according to another embodiment of the present invention. It is unnecessary to tune all the write strategy parameters simultaneously if the performance in some specific combination(s) out of all the combinations (nT, mT) respectively related to the data set types ($L_{nT}$, $P_{mT}$) and ($P_{nT}$, $L_{mT}$) is acceptable.

Figure 3:
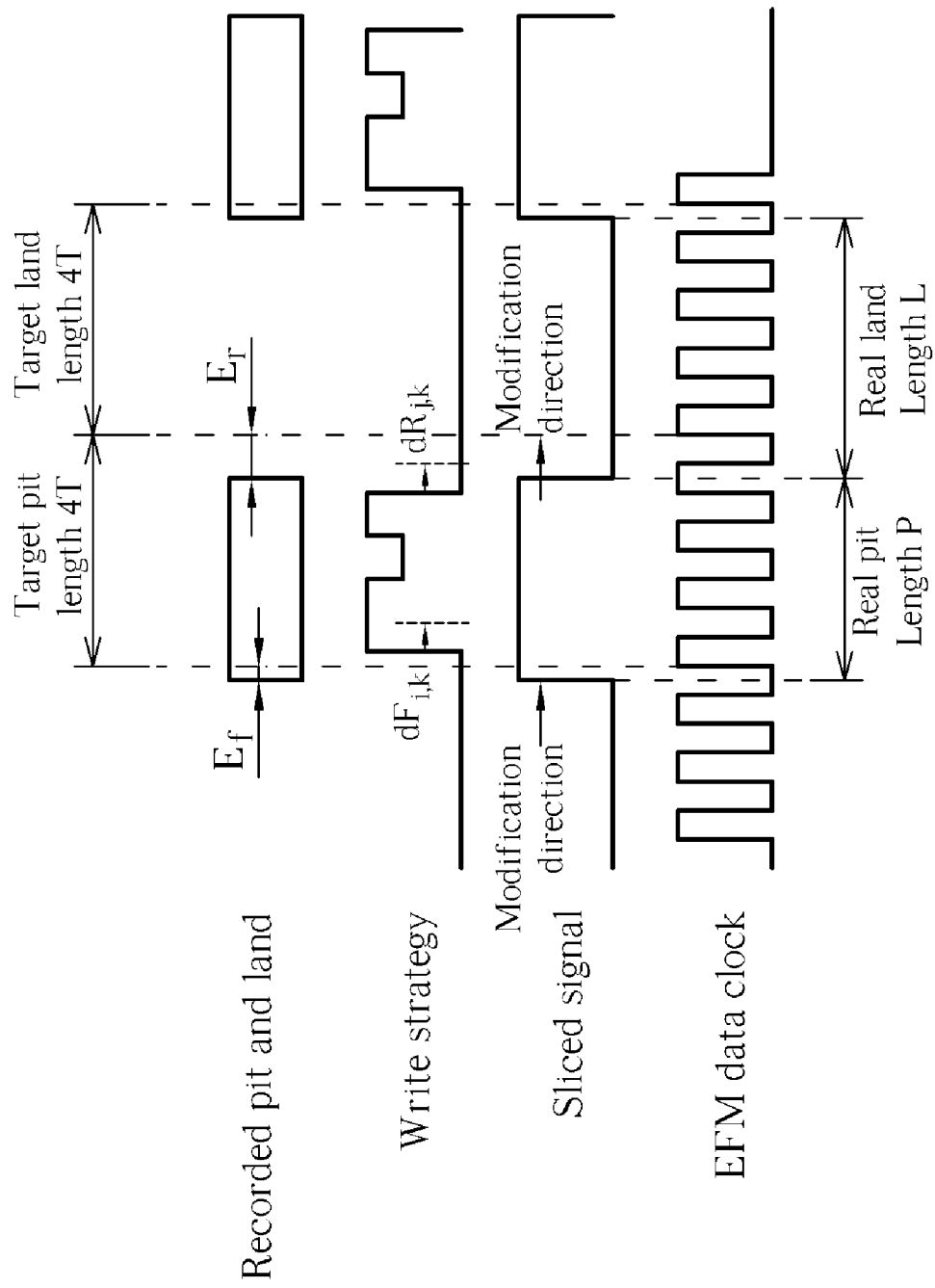
FIG. 3 is a length compensation illustration of the method shown in FIG. 2.

FIG. 3 illustrates a length compensation illustration of the method 910 shown in FIG. 2, wherein a pit having a target pit length of 4T followed by an adjacent land having a target land length of 4T is taken as an example. The values $E_f$ and $E_r$ shown in FIG. 3 respectively represent a fore location error and a rear location error of the pit, and it is obvious that the value $E_r$ also represents a fore location error of the following land. As shown in FIG. 3, the compensation values $dF_{i,k}$ and $dR_{j,k}$ are utilized for tuning the write strategy parameters $F_{i,k}$ and $R_{j,k}$, respectively, where the compensation values $dF_{i,k}$ and $dR_{j,k}$ can be derived from the following equations:

$$dF_{i,k}=G_{i,k,L}*\Delta L_{nT}-G_{i,k,P}*\Delta P_{mT}$$

$$dR_{j,k}=H_{j,k,P}*\Delta P_{nT}-H_{j,k,L}*\Delta L_{mT}$$

Through multiplying the calculation results $\Delta L_{nT}$, $\Delta P_{mT}$, $\Delta P_{nT}$, and $\Delta L_{mT}$ by the weighted factors $G_{i,k,L}$, $G_{i,k,P}$, $H_{j,k,P}$, and $H_{j,k,L}$, respectively, the MPU is capable of adjusting the calculation results $\Delta L_{nT}$, $\Delta P_{mT}$, $\Delta P_{nT}$, and $\Delta L_{mT}$ with the weighted factors $G_{i,k,L}$, $G_{i,k,P}$, $H_{j,k,P}$, and $H_{j,k,L}$ to generate the adjusted results ($G_{i,k,L}*\Delta L_{nT}$), ($G_{i,k,P}*\Delta P_{mT}$), ($H_{j,k,P}*\Delta P_{nT}$), and ($H_{j,k,L}*\Delta L_{mT}$), which are utilized for tuning the write strategy parameters $F_{i,k}$ and $R_{j,k}$ as shown in the equations mentioned above. Then the MPU may tune the write strategy parameters $F_{i,k}$ and $R_{j,k}$ according to the following equations:

$$F_{i,k+1}=F_{i,k}+dF_{i,k}$$

$$R_{j,k+1}=R_{j,k}+dR_{j,k}$$

Please note that in order to get better performance of the write strategy tuning for the materials currently applicable to the optical storage medium, the weighted factors $G_{i,k,L}$, $G_{i,k,P}$, $H_{j,k,P}$, and $H_{j,k,L}$ can be set to values less than 1 and can be set to have decreasing values while k increases. However, this is not a limitation of the present invention. In addition, in a special case of the first embodiment, either the weighted factors $G_{i,k,L}$ and $H_{j,k,P}$ can be set to zero values or the weighted factors $G_{i,k,P}$ and $H_{j,k,L}$ can be set to zero values in order to save the calculation loading of the write strategy tuning and save the storage volume requirement of memory resources such as the memory 120 and other memories of other embodiments utilized during the write strategy tuning.

In Step 924, the optical storage device then writes data on the optical storage medium utilizing the latest values of the write strategy parameters $F_{i,k}$ and $R_{j,k}$. After executing Step 924, Step 914 is executed. As a result, the working flow of the method 910 runs until the write strategy parameters are tuned to reach a predetermined precision set by Step 920 utilizing criteria such as the specific threshold mentioned above.

After retaining the teaching related to the method 910, those skilled in the art would understand that at least a portion of the steps shown in FIG. 2 can be executed by various kinds of devices implemented utilizing hardware, software, or combinations of hardware, software, etc. according to another embodiment of the present invention. For example, according to the case that the computer executing the application program performs the calculations mentioned above, Step 918, 920, and/or 922 can be executed by the computer executing the application program. According to this case, the lengths L and P can be sent to the computer executing the application program, so the computer executing the application program may classify the length sets (L, P) and (P, L), and calculate the average length deviations such as the calculation results ($\Delta L_{nT}$, $\Delta P_{mT}$) and ($\Delta P_{nT}$, $\Delta L_{mT}$) mentioned above. According to an implementation choice of the present invention, the computer executing the application program may determine if tuning the write strategy parameters is needed. According to various implementation choices, the computer executing the application program or the MPU executing the firmware code may calculate the latest values of the write strategy parameters $F_{i,k}$ and $R_{j,k}$ if tuning the write strategy parameters is needed. According to an implementation choice that the computer executing the application program calculates the latest values of the write strategy parameters $F_{i,k}$ and $R_{j,k}$, the computer executing the application program may send the latest values of the write strategy parameters $F_{i,k}$ and $R_{j,k}$ or the compensation values $dF_{i,k}$ and $dR_{j,k}$ back to the optical storage device. According to various implementation choices, the computer executing the application program or the MPU executing the firmware code may tune the write strategy parameters $F_{i,k}$ and $R_{j,k}$, so the MPU executing the firmware code may write data on the optical storage medium utilizing the latest values of the write strategy parameters $F_{i,k}$ and $R_{j,k}$. After executing Step 924, Steps 914-920 are executed to check if further write strategy tuning is required.

Figure 4:
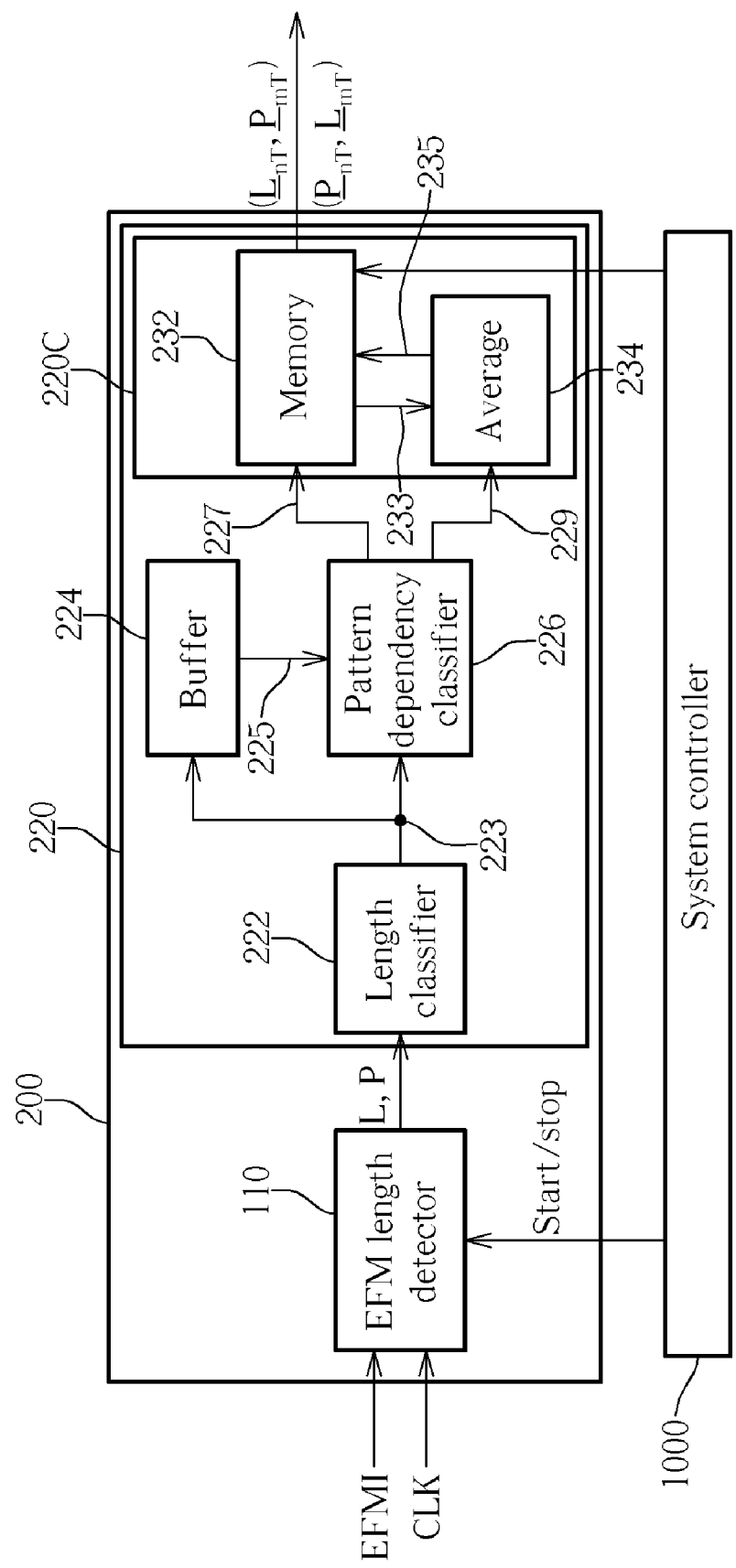
FIG. 4 is a diagram of a combination of a system controller and an average EFM length measurement device according to an embodiment of the present invention.

FIG. 4 illustrates a diagram of a system controller 1000 coupled to an average EFM length measurement device 200 according to a second embodiment of the present invention. In addition to the EFM length detector 110 shown in FIG. 1, the average EFM length measurement device 200 of the second embodiment further includes a calculation module 220 for executing a portion of Step 918 to generate the average length sets ($\underline{L}_{nT}$, $\underline{P}_{mT}$) and ($\underline{P}_{nT}$, $\underline{L}_{mT}$) as the calculation results of the average EFM length measurement device 200, and then the MPU executing another firmware code may complete the rest of the calculations disclosed by Step 918.

As shown in FIG. 4, the calculation module 220 includes a length classifier 222, a buffer 224, a pattern dependency classifier 226, and a calculator 220C, and the calculator 220C includes a memory 232 and an average unit 234. According to the second embodiment, the length classifier 222 is capable of identifying each of the pit lengths P with one of the target pit lengths, which may be the lengths of 3T, 4T, . . . or, 11T. Similarly, the length classifier 222 is also capable of identifying each of the land lengths L with one of the target land lengths, which are the lengths of 3T, 4T, . . . , 11T. According to this embodiment, the length classifier 222 encodes a length L or P together with the corresponding target length (i.e. what the length L or P is classified to be) to generate an encoded data 223 having information of the length (length L or P) and the corresponding target length. The buffer 224 buffers the encoded data 223 and outputs the buffered data 225. Here if the encoded data 223 corresponds to a current length, the buffered data 225 corresponds to a previous length. As a result, the buffer 224 buffers the previous length for further forming, in the pattern dependency classifier 226, a data set (L, P) or (P, L) including the previous length and the current length.

The pattern dependency classifier 226 then classifies the data sets (L, P) into the data set types ($L_{nT}$, $P_{mT}$) by storing each of the data sets (L, P) into one of a plurality of regions respectively corresponding to the data set types ($L_{nT}$, $P_{mT}$) in the memory 232. Similarly, the pattern dependency classifier 226 also classifies the data sets (P, L) into the data set types ($P_{nT}$, $L_{mT}$) by storing each of the data sets (P, L) into one of a plurality of regions respectively corresponding to the data set types ($P_{nT}$, $L_{mT}$) in the memory 232.

For a specific data set type out of the data set types ($L_{nT}$, $P_{mT}$), the average unit 234 is capable of averaging the lengths L corresponding to lands to generate an average length $\underline{L}_{nT}$ corresponding to the specific data set type and is capable of averaging the lengths P corresponding to pits to generate an average length $\underline{P}_{mT}$ corresponding to the specific data set type. Similarly, for a specific data set type out of the data set types ($P_{nT}$, $L_{mT}$), the average unit 234 is capable of averaging the lengths P corresponding to pits to generate an average length $\underline{P}_{nT}$ corresponding to the specific data set type and is capable of averaging the lengths L corresponding to lands to generate an average length $\underline{L}_{mT}$ corresponding to the specific data set type.

According to this embodiment, the average unit 234 is implemented utilizing a moving average unit. In addition, for each of the data set types ($L_{nT}$, $P_{mT}$), e.g. the data set type ($L_{nT}$, $P_{mT}$) having n=n0 and m=m0, the average unit 234 averages the lengths L corresponding to lands and averages the lengths P corresponding to pits to generate an average length set ($\underline{L}_{n0*T}$, $\underline{P}_{n0*T}$) corresponding to the data set type ($L_{n0*T}$, $P_{m0*T}$). As a result, the calculator 220C may utilize the data sets (L, P) corresponding to the data set type ($L_{n0*T}$, $P_{m0*T}$) to generate the calculation result ($\underline{L}_{n0*T}$, $\underline{P}_{m0*T}$) for the data set type ($L_{n0*T}$, $P_{m0*T}$). In general, the calculator 220C generates the calculation results ($\underline{L}_{nT}$, $\underline{P}_{mT}$) for the data set types ($L_{nT}$, $P_{mT}$), respectively.

Similarly, for each of the data set types ($P_{nT}$, $L_{mT}$), e.g. the data set type ($P_{nT}$, $L_{mT}$) having n=n0 and m=m0, the average unit 234 averages the lengths L corresponding to lands and averages the lengths P corresponding to pits to generate an average length set ($\underline{P}_{n0*T}$, $\underline{L}_{m0*T}$) corresponding to the data set type ($P_{n0*T}$, $L_{m0*T}$). As a result, the calculator 220C may utilize the data sets (P, L) corresponding to the data set type ($P_{n0*T}$, $L_{m0*T}$) to generate the calculation result ($\underline{P}_{n0*T}$, $\underline{L}_{m0*T}$) for the data set type ($P_{n0*T}$, $L_{m0*T}$). In general, the calculator 220C generates the calculation results ($\underline{P}_{nT}$, $\underline{L}_{mT}$) for the data set types ($P_{nT}$, $L_{mT}$), respectively.

Similar to the first embodiment, in a special case of the second embodiment, either the weighted factors $G_{i,k,L}$ and $H_{j,k,P}$ can be set to zero values or the weighted factors $G_{i,k,P}$ and $H_{j,k,L}$ can be set to zero values in order to save the calculation loading of the write strategy tuning and save the storage volume requirement of the memory resources such as the memory 232 utilized during the write strategy tuning. In this special case, the calculator 220C may generate either the average lengths $\underline{L}_{nT}$ or the average lengths $\underline{P}_{mT}$ as the calculation results (i.e. outputs of the calculation module 220) for the data set types ($L_{nT}$, $P_{mT}$), respectively. Similarly, the calculator 220C may generate either the average lengths $\underline{P}_{nT}$ or the average lengths $\underline{L}_{mT}$ as the calculation results for the data set types ($P_{nT}$, $L_{mT}$), respectively.

Figure 5:
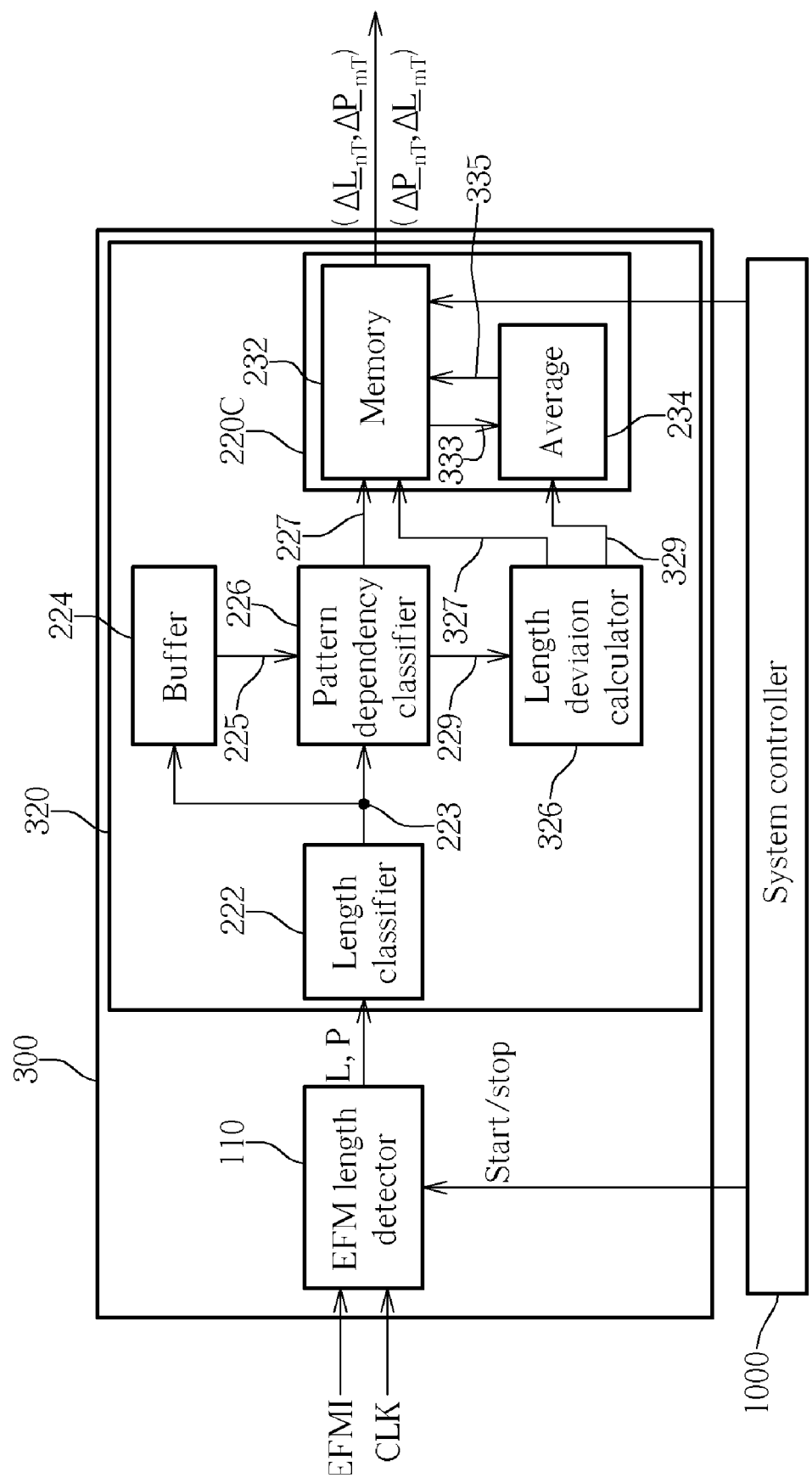
FIG. 5 is a diagram of a combination of a system controller and an average EFM length deviation measurement device according to an embodiment of the present invention.

Please refer to FIG. 5 illustrating a diagram of a system controller 1000 coupled to an average EFM length deviation measurement device 300 according to a third embodiment of the present invention. In addition to the EFM length detector 110 shown in FIG. 1, the average EFM length deviation measurement device 300 of the third embodiment further includes a calculation module 320 utilized for executing a portion of Step 918 to generate average length deviation sets ($\Delta\underline{L}_{nT}$, $\Delta\underline{P}_{mT}$) and ($\Delta\underline{P}_{nT}$, $\Delta\underline{L}_{mT}$) as the calculation results of the average EFM length deviation measurement device 300.

In addition to the length classifier 222, the buffer 224, the pattern dependency classifier 226, and the calculator 220C shown in FIG. 4, the calculation module 320 shown in FIG. 5 further includes a length deviation calculator 326. According to the third embodiment, the pattern dependency classifier 226 further outputs the lengths L and P of the data sets (L, P) and (P, L) to the length deviation calculator 326. As mentioned above, the length classifier 222 encodes the length L or P together with the corresponding target length (i.e. what the length L or P is classified to be) to generate the encoded data 223 having the information of the length (length L or P) and the corresponding target length, so such information can be transmitted between two elements of the calculation module such as the calculation module 220 of the second embodiment and the calculation module 320 of the third embodiment.

As a result, when receiving the lengths L and P of the data sets (L, P) transmitted utilizing the encoded data 229, the length deviation calculator 326 may simply replace the lengths L and P of the data sets (L, P) corresponding to the data set types ($L_{nT}$, $P_{mT}$) with corresponding length deviation values $\Delta L_{nT}$ and $\Delta P_{mT}$, respectively, wherein the length deviation calculator 326 calculates the length deviation values $\Delta L_{nT}$ and $\Delta P_{mT}$ according to the following equations:

$$\Delta L_{nT}=L-nT$$

$$\Delta P_{mT}=P-mT$$

Similarly, when receiving the lengths P and L of the data sets (P, L) transmitted utilizing the encoded data 229, the length deviation calculator 326 may simply replace the lengths P and L of the data sets (P, L) corresponding to the data set types ($P_{nT}$, $L_{mT}$) with corresponding length deviation values $\Delta P_{nT}$ and $\Delta L_{mT}$, respectively, wherein the length deviation calculator 326 calculates the length deviation values $\Delta P_{nT}$ and $\Delta L_{mT}$ according to the following equations:

$$\Delta P_{nT}=P-nT$$

$$\Delta L_{mT}=L-mT$$

As a result of the circuit coupling shown in FIG. 5, for each of the data set types ($L_{nT}$, $P_{mT}$), the calculator 220C may simply calculate the average values $\Delta \underline{L}_{nT}$ of length deviation values $\Delta L_{nT}$, respectively, rather than the average values $\underline{L}_{nT}$, and calculate the average values $\Delta \underline{P}_{mT}$ of length deviation values $\Delta P_{mT}$, respectively, rather than the average values $\underline{P}_{mT}$. Similarly, for each of the data set types ($P_{nT}$, $L_{mT}$), the calculator 220C may simply calculate the average values $\Delta \underline{P}_{nT}$ of length deviation values $\Delta P_{nT}$, respectively, rather than the average values $\underline{P}_{nT}$, and calculate the average values $\Delta \underline{L}_{mT}$ of length deviation values $\Delta L_{mT}$, respectively, rather than the average values $\underline{L}_{mT}$.

Similar to the first embodiment, in a special case of the third embodiment, either the weighted factors $G_{i,k,L}$ and $H_{j,k,P}$ can be set to zero values or the weighted factors $G_{i,k,P}$ and $H_{j,k,L}$ can be set to zero values in order to save the calculation loading of the write strategy tuning and save the storage volume requirement of the memory resources such as the memory 232 utilized during the write strategy tuning. In this special case, the calculator 220C may generate either the average values $\Delta \underline{L}_{nT}$ or the average values $\Delta \underline{P}_{mT}$ as the calculation results (i.e. the outputs of the calculation module 220) for the data set types ($L_{nT}$, $P_{mT}$), respectively. Similarly, the calculator 220C may generate either the average values $\Delta \underline{P}_{nT}$ or the average values $\Delta \underline{L}_{mT}$ as the calculation results for the data set types ($P_{nT}$, $L_{mT}$), respectively.

In a variation of the second embodiment, a length deviation calculator coupled to the average EFM length measurement device 200 is utilized for executing a portion of Step 918 to generate the average length deviation sets ($\Delta \underline{L}_{nT}$, $\Delta \underline{L}_{mT}$) and ($\Delta \underline{P}_{nT}$, $\Delta \underline{L}_{mT}$) through similar calculations as those disclosed above. The length deviation calculator of this variation generates the average length deviation sets ($\Delta \underline{L}_{nT}$, $\Delta \underline{P}_{mT}$) and ($\Delta \underline{P}_{nT}$, $\Delta \underline{L}_{mT}$) according to the calculation results ($\underline{L}_{nT}$, $\underline{P}_{mT}$) and ($\underline{P}_{nT}$, $\underline{L}_{mT}$) received from the average EFM length measurement device 200 and outputs the average length deviation sets ($\Delta \underline{L}_{nT}$, $\Delta \underline{P}_{mT}$) and ($\Delta \underline{P}_{nT}$, $\Delta \underline{L}_{mT}$), so as mentioned, the MPU executing the firmware code or the computer executing the application program may utilize the average length deviation sets ($\Delta \underline{L}_{nT}$, $\Delta \underline{P}_{mT}$) and ($\Delta \underline{P}_{nT}$, $\Delta \underline{L}_{mT}$) outputted from the length deviation calculator of this variation to continue some other step(s) such as Steps 920 and/or 922.

Please note that since an averaging result of the averaging operation is proportional to a summing result of the summing operation for the same group of data, the average unit 234 can be replaced with a summing unit according to another embodiment of the present invention. Therefore, the averaging operation of the average unit 234 is replaced with the summing operation of the summing unit. After retaining the teachings of the present invention, those skilled In the art should understand that variations of such calculations can be applied to other embodiments of the present invention.

In addition, although in the embodiments mentioned above, each of the data set types corresponds to a combination of a specific target pit length and a specific target land length or a combination of a specific target land length and a specific target pit length, it is not a limitation of the present invention. Please note that in other embodiments of the present invention, each or one of the data set types may correspond to a combination of at least a specific target pit length and specific target land lengths, or a combination of at least a specific target land length and specific target pit lengths, or a combination of specific target land lengths and specific target pit lengths. As a result, the write strategy parameters can be tuned further according to more adjacent pits or lands.

Figure 6:
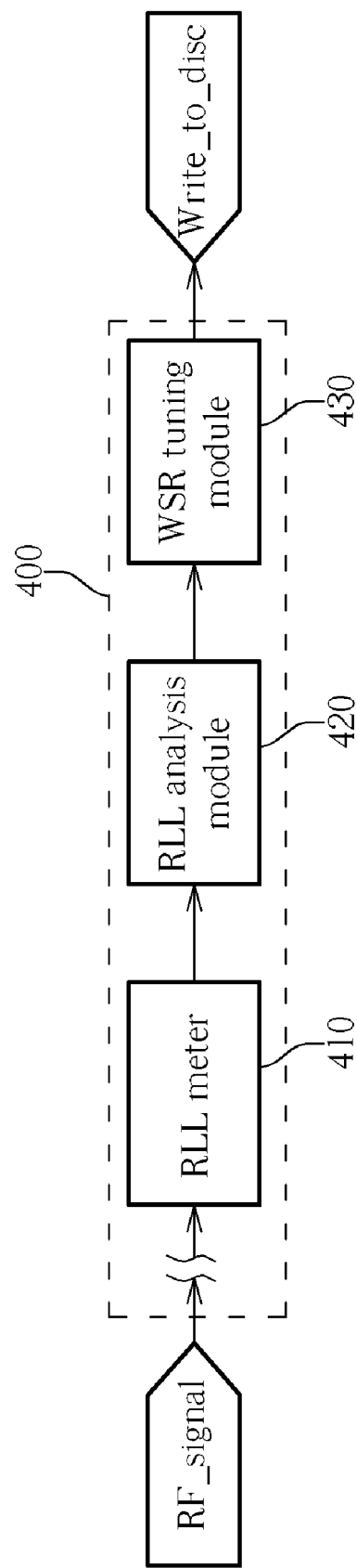
FIG. 6 is a diagram of a system for tuning write strategy parameters of an optical storage device according to an embodiment of the present invention.

Please refer to FIG. 6. FIG. 6 is a diagram of a system 400 for tuning write strategy parameters of an optical storage device according to an embodiment of the present invention, where the system 400 comprises a run-length limited (RLL) meter 410, a RLL analysis module 420, and a write strategy (WSR) tuning module 430. Comparing with the embodiments mentioned above, the RLL meter 410 of this embodiment replaces the EFM length detector 110, the RLL analysis module 420 of this embodiment replaces the calculation module 220 or the calculation module 320, and the WSR tuning module 430 plays a role like a later stage of the calculation module 220 (or 320), where the WSR tuning module 430 tunes the write strategy parameters and generates a write signal Write_to_disc according to the write strategy parameters.

In general, the RLL meter can be coupled to a reproduced signal such as the RF signal RF_signal representing data read from the optical storage medium. In addition, the RLL meter 410 detects a plurality of lengths according to the RF signal RF_signal to generate a plurality of RLL values as the lengths mentioned above, and the RLL analysis module 420 performs calculations according to the lengths to generate a plurality of calculation results, which are also referred to as RLL analysis results in this embodiment, so the write strategy parameters are tuned by the WSR tuning module 430 according to the calculation results. In this embodiment, each of the RLL values is the distance between two zero-crossing positions of the RF signal RF_signal. Additionally, each RLL value is corresponding to a pit or a land on the optical storage medium. According to different embodiments of the present invention, the RLL analysis results can be pattern dependent or pattern independent.

Figure 7:
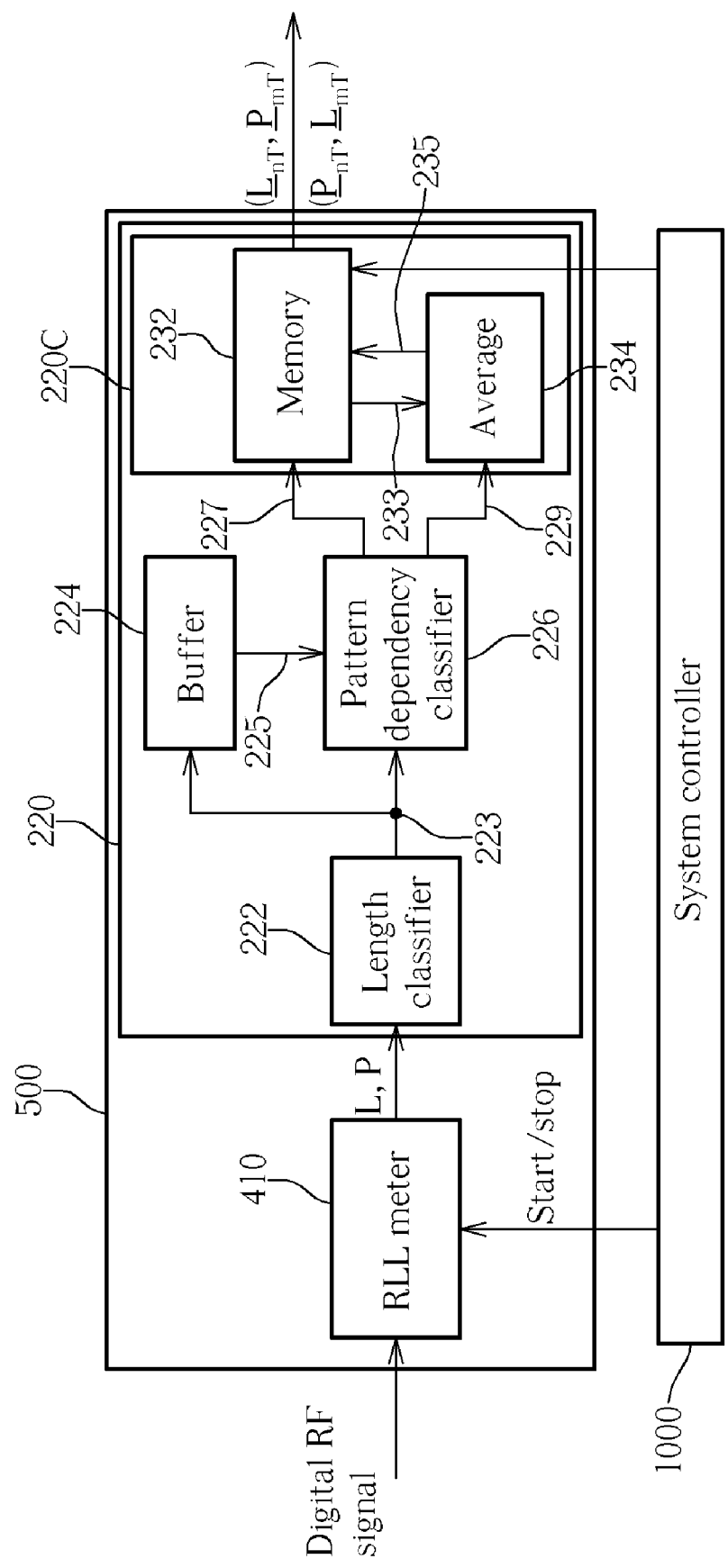
FIG. 7 is a diagram of a system for tuning write strategy parameters of an optical storage device according to an embodiment of the present invention.

Please refer to FIG. 7. FIG. 7 is a diagram of a system 500 for tuning write strategy parameters of an optical storage device according to an embodiment of the present invention, where the system 500 generates pattern dependent RLL analysis results such as ($\underline{L}_{nT}$, $\underline{P}_{mT}$) and ($\underline{P}_{nT}$, $\underline{L}_{mT}$). As shown in FIG. 7, the system 500 comprises the RLL meter 410 shown in FIG. 6 and the calculation module 220 shown in FIG. 4. In this embodiment, the RLL meter 410 receives a digital signal such as a digital RF signal Digital_RF_signal, which is a digital form of the RF signal RF_signal mentioned above. For example, an analog-to-digital converter (ADC) can be utilized for performing analog-to-digital conversion on the RF signal RF_signal to convert the RF signal RF_signal into the digital RF signal Digital_RF_signal. According to this embodiment, these pattern dependent RLL analysis results are utilized for tuning certain write strategy parameters, for example, an overdrive (OD) width of at least one write pulse corresponding to one of the data set types (i.e., $(L_{nT}, P_{mT})$, and $(P_{nT}, L_{mT})$), or certain edge delay parameters such as the write strategy parameters $F_{i,k}$ and $R_{j,k}$ mentioned above.

Figure 8:
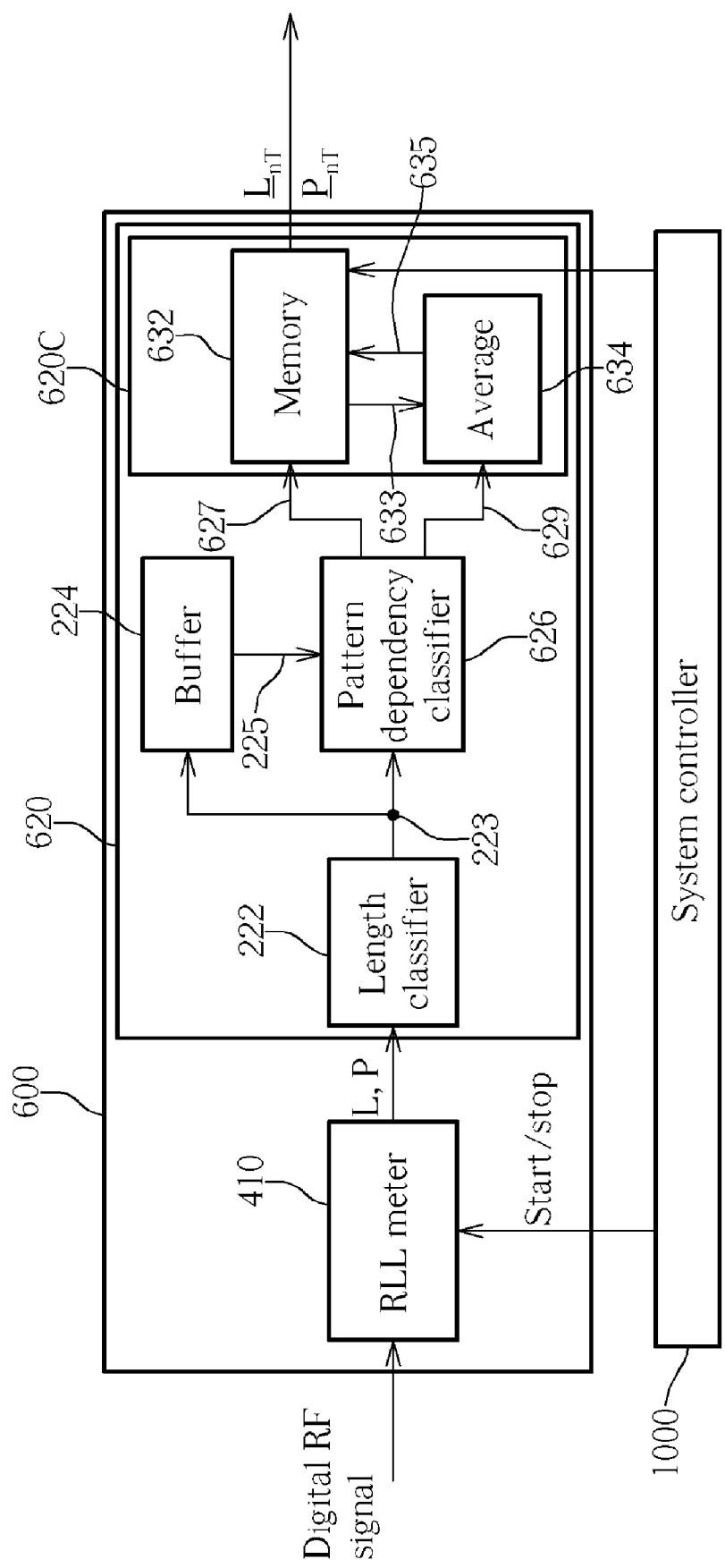
FIG. 8 is a diagram of a system for tuning write strategy parameters of an optical storage device according to an embodiment of the present invention.

Please refer to FIG. 8. FIG. 8 is a diagram of a system 600 for tuning write strategy parameters of an optical storage device according to an embodiment of the present invention, where the system 600 generates pattern dependent RLL analysis results such as $\underline{L}_{nT}$ and $\underline{P}_{nT}$. As shown in FIG. 8, the system 600 comprises the RLL meter 410 mentioned above and a calculation module 620, which replaces the calculation module 220 in the embodiment shown in FIG. 7. In addition to the length classifier 222 and the buffer 224 mentioned above, the calculation module 620 further comprises a pattern dependency classifier 626 and a calculator 620C corresponding to the pattern dependency classifier 626, where the calculator 620C comprises a memory 632 and an average unit 634. In this embodiment, the RLL meter 410 also receives the digital RF signal Digital_RF_signal, which is the digital form of the RF signal RF_signal mentioned above. According to this embodiment, these pattern dependent RLL analysis results are utilized for tuning certain write strategy parameters, for example, a peak power level P_peak or a write power level P_write of the write pulse corresponding to one of the data types (i.e., $L_{nT}$, $P_{mT}$, $P_{nT}$, and $L_{mT}$) mentioned above, or a power ratio R_p, where the power ratio R_p is equal to the ratio of the write power level P_write to the peak power level P_peak.

According to this embodiment, these pattern dependent RLL analysis results are utilized for tuning certain write strategy parameters, for example, an OD width of at least one write pulse corresponding to one of the data types (i.e., $L_{nT}$, $P_{mT}$, $P_{nT}$, and $L_{mT}$), or certain edge delay parameters such as the write strategy parameters $F_{i,k}$ and $R_{j,k}$ mentioned above.

According to the embodiments shown in FIG. 6, FIG. 7, and FIG. 8, the zero-crossing positions can be determined by utilizing analytic methods or searching methods. In addition, some of the write strategy parameters are tuned by utilizing at least one analytic method, and some of the write strategy parameters are tuned by utilizing at least one searching method.

Figure 9:
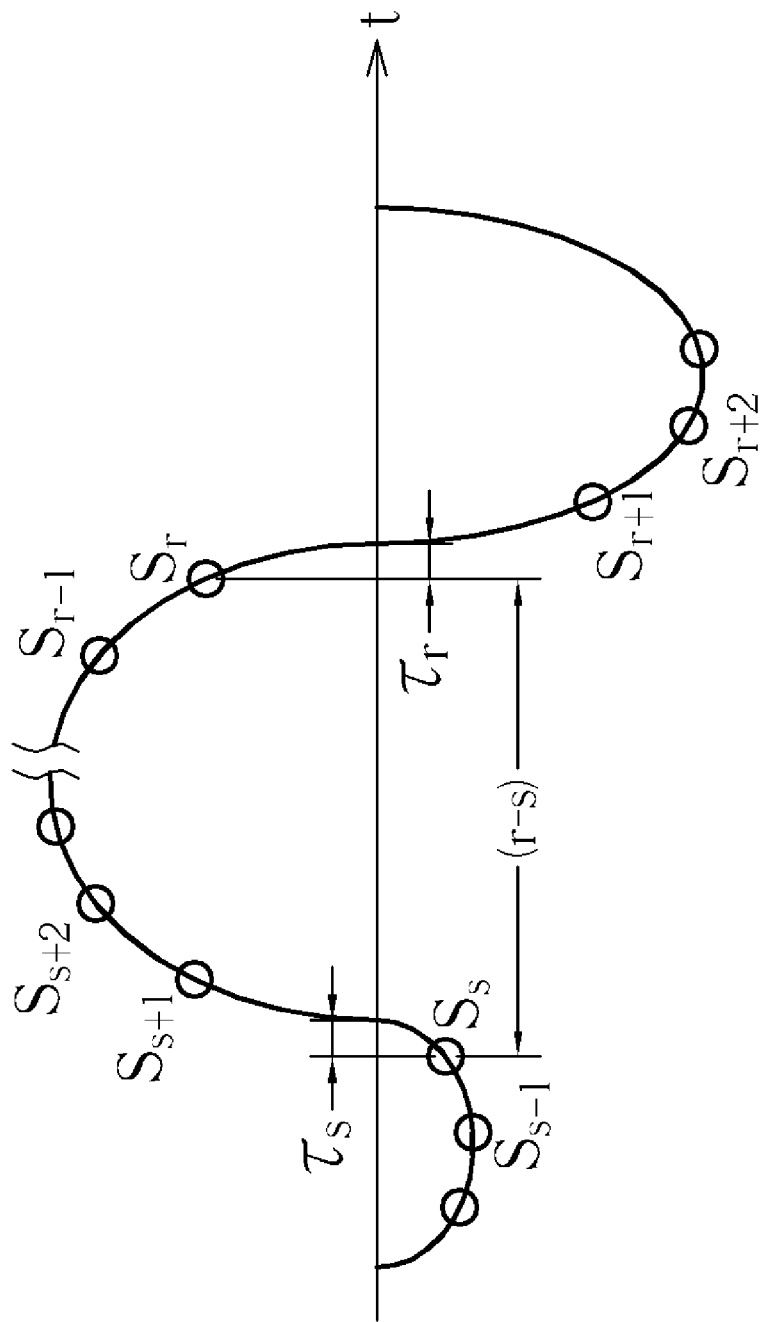
FIG. 9 illustrates a sequence of sampled values generated by an analog-to-digital converter (ADC) and variables utilized in an analytic method according to an embodiment of the present invention.

Please refer to FIG. 9. FIG. 9 illustrates a sequence of sampled values generated by the ADC mentioned above, and lengths may be determined by these sampled values and variables $\tau_r$ and $\tau_s$ according to an analytic method, where the sampled values $S_{s-1}$, $S_s$, $S_{s+1}$, $S_{s+2}$, ..., $S_{r-1}$, $S_r$, $S_{r+1}$, $S_{r+2}$, etc. are sampled from the RF signal RF_signal and carried by the digital RF signal Digital_RF_signal. According to this embodiment, a length between two zero-crossing points, for example, a first zero-crossing point between the sampled values $S_s$ and $S_{s+1}$ and a second zero-crossing point between the sampled values $S_r$ and $S_{r+1}$, can be derived according to an approximation that the segment between two sampled values adjacent to a zero-crossing point is considered to be a linear segment. Thus, the variables $\tau_r$ and $\tau_s$ can be calculated according to the following equations:

$$\tau_r = \frac{\mathrm{abs}(S_r)}{\mathrm{abs}(S_r - S_{r+1})} = \frac{S_r}{S_r - S_{r+1}}; \text{ and}$$

$$\tau_s = \frac{\mathrm{abs}(S_s)}{\mathrm{abs}(S_s - S_{s+1})} = \frac{S_s}{S_s - S_{s+1}};$$

where the function abs(x) represents the absolute value of x. As a result, the length (i.e., the RLL value) between the first and second zero-crossing points is equal to $(-\tau_s+(s-r)+\tau_r)$.

Figure 10:
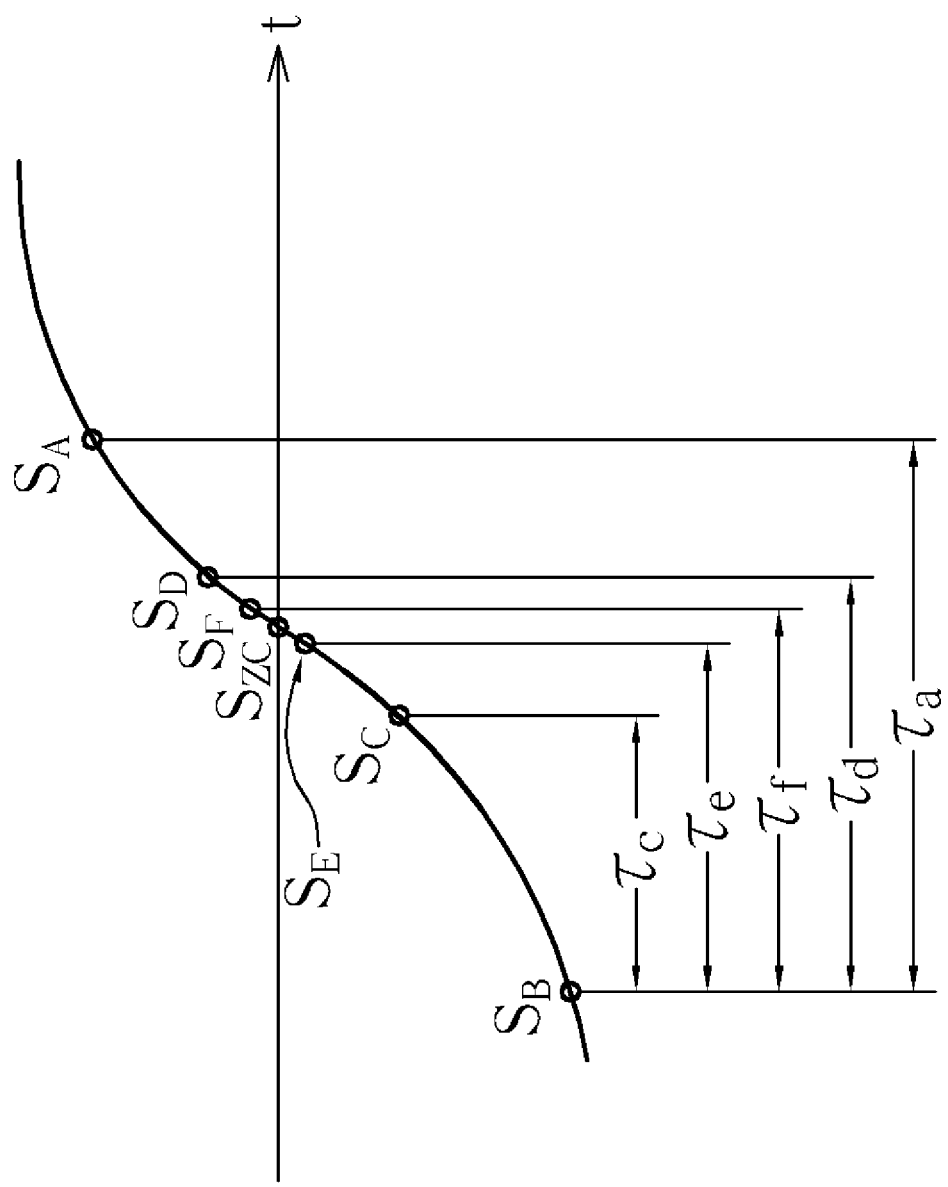
FIG. 10 illustrates a sequence of sampled values generated by an ADC and variables utilized in a searching method according to an embodiment of the present invention.

Please refer to FIG. 10. FIG. 10 illustrates a sequence of sampled values generated by the ADC mentioned above, and the zero-crossing point is estimated using a searching method, where the sampled values $S_A$ and $S_B$ are sampled from the RF signal RF_signal and carried by the digital RF signal Digital_RF_signal. In addition, the sampled values $S_A$ and $S_B$ are adjacent sampled values enclosing a zero-crossing point $S_{ZC}$. As shown In FIG. 10, each of the variables $\tau_c$, $\tau_d$, $\tau_e$, $\tau_f$, etc. represents the length between the sampled value $S_B$ and a corresponding approximating point out of the approximating points $S_C$, $S_D$, $S_E$, $S_F$, etc., where the length is measured along the horizontal axis. For example, the variable $\tau_c$ represents the length between the sampled value $S_B$ and the approximating point $S_C$.

According to this embodiment, the RLL meter 410 derives the approximating point $S_C$ by performing interpolation according to the sampled values $S_A$ and $S_B$. As the approximating point $S_C$ has the same sign as the sampled value $S_B$, the RLL meter 410 further derives the approximating point $S_D$ by performing interpolation according to the sampled value $S_A$ and the approximating point $S_C$. As the approximating point $S_D$ has the same sign as the sampled value $S_A$, the RLL meter 410 further derives the approximating point $S_E$ by performing interpolation according to the approximating points $S_C$ and $S_D$. According to the same method, the RLL meter 410 is capable of deriving the approximating point $S_F$ and some other approximating points that are closer to the zero-crossing point $S_{ZC}$ by iterations to approach the zero-crossing point $S_{ZC}$ with a predetermined resolution. As a result, the RLL meter 410 substantially derives an approximate value of the length between the sampled value $S_B$ and the zero-crossing point $S_{ZC}$, where the approximate value can be utilized as the variable $\tau_r$ or the variable $\tau_s$ in the embodiment shown in FIG. 9.

According to this embodiment, the length between the sampled values $S_A$ and $S_B$ adjacent to the zero-crossing point $S_{ZC}$ can be linear-segmented. Thus, the variables $\tau_c$, $\tau_d$, $\tau_e$, $\tau_f$, etc. can be derived as follows:

$$\tau_c = \frac{\tau_u}{2}$$

$$\tau_d = \frac{\tau_a + \tau_c}{2}$$

$$\tau_e = \frac{\tau_d + \tau_c}{2}$$

$$\tau_f = \frac{\tau_d + \tau_c}{2}$$

... ;

or $$\tau_c = \frac{1}{2}$$

$$\tau_d = \frac{1}{2} + \frac{1}{4}$$

$$\tau_e = \frac{1}{2} + \frac{1}{4} - \frac{1}{8}$$

$$\tau_f = \frac{1}{2} + \frac{1}{4} - \frac{1}{8} + \frac{1}{16}$$

According to a variation of this embodiment, the length between the sampled values $S_A$ and $S_B$ adjacent to the zero-crossing point $S_{ZC}$ is not segmented linearly. In this variation, more than two sampled values, for example, four sampled values such as the sampled values $S_{s-1}$, $S_s$, $S_{s+1}$, and $S_{s+2}$ shown in FIG. 9, are utilized for deriving an approximate waveform of the RF signal RF_signal. Accordingly, the variables $\tau_c$, $\tau_d$, $\tau_e$, $\tau_f$ etc. can be derived by performing interpolation along the approximate waveform.

Figure 11:
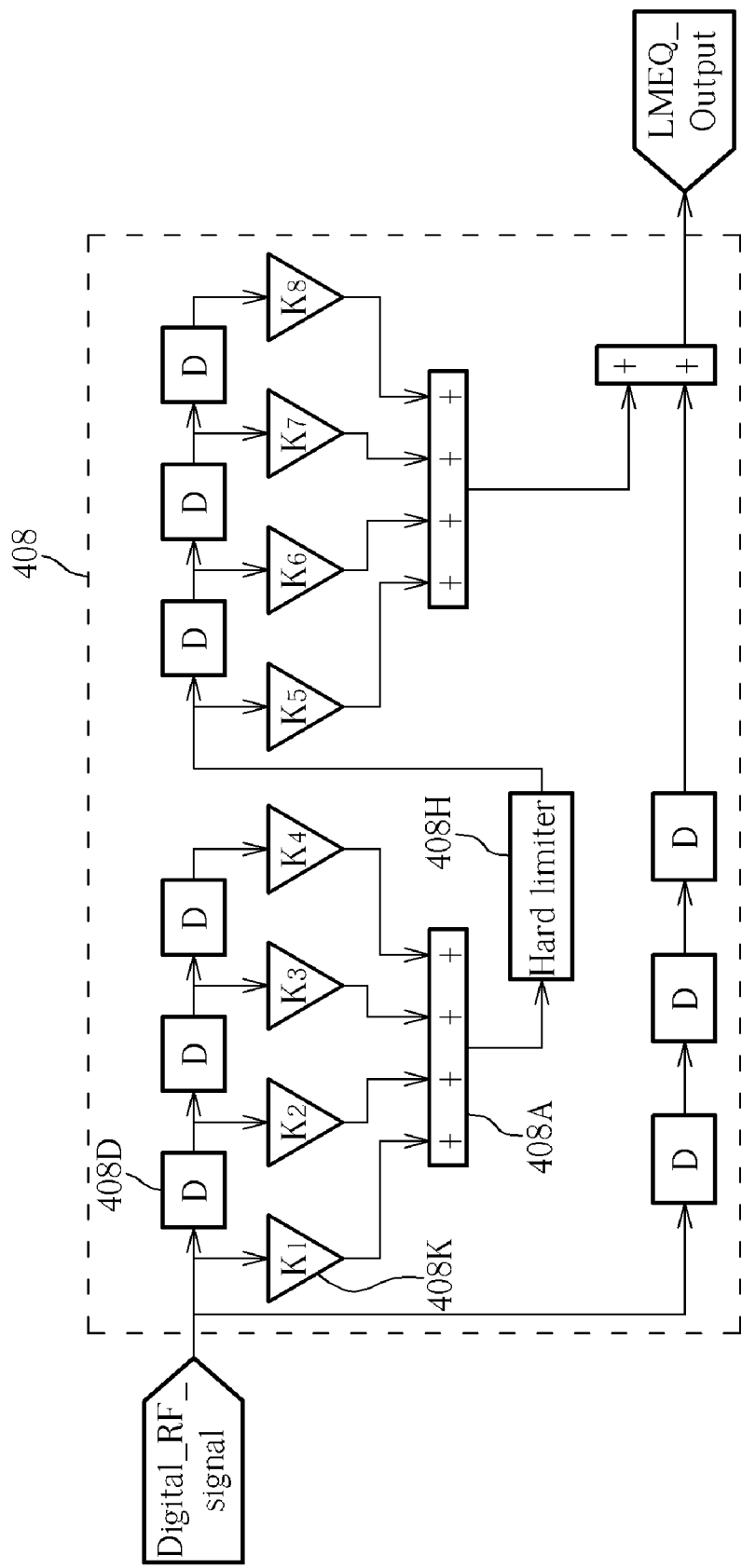
FIG. 11 is a diagram of a limit equalizer (LMEQ) according to an embodiment of the present invention.

Please note that for high density recording, some transition in a data stream does not result in the transition in the RF signal RF_signal, so additional signal processing is required to enhance the reliability of the RLL meter 410 in this situation. Please refer to FIG. 11. FIG. 11 is a diagram of a limit equalizer (LMEQ) 408 according to an embodiment of the present invention, where the LMEQ 408 can be coupled between the ADC mentioned above and the RLL meter 410. The LMEQ 408 is utilized for equalizing the digital RF signal Digital_RF_signal to generate another digital signal LMEQ_Output corresponding to the digital RF signal Digital_RF_signal. The LMEQ comprises an interpolator, a hard limiter, and a filter. In an embodiment as shown in FIG. 11, the LMEQ 408 is composed of delay units 408D (which are labeled as "D" in FIG. 11), amplifiers 408K respectively having gain values $K_1, K_2, \ldots, K_8$, adders (e.g., 408A), and a hard limiter 408H.

The digital RF signal Digital_RF_signal is inputted into the interpolator with coefficients $[K_1, K_2, K_3, K_4]$. In this embodiment, $[-u/2, (1+u)/2, (1+u)/2, -u/2]$ can be utilized as the gains $[K_1, K_2, K_3, K_4]$, where $u=3/16$. The output of the interpolator is referred to as the interpolated RF signal. The interpolated RF signal is inputted into the hard limiter 408H. The hard limiter 408H compares the interpolated RF signal with a threshold value. If the absolute value of the interpolated RF signal is less than the threshold value, the output of the hard limiter 408H is equal to the interpolated RF signal; otherwise, the output of the hard limiter 408H has the same sign as the interpolated RF signal, where the absolute value of the output of the hard limiter 408H is equal to the threshold value. The output of the hard limiter 408H is then equalized by the filter with coefficients $[K_5, K_6, K_7, K_8]$. In this embodiment, $[-v, v, v, -v]$ can be utilized as the gains $[K_5, K_6, K_7, K_8]$, where $v=1$. At last, by properly summing a delayed digital RF signal (the signal through the lower path shown in FIG. 11) and the hard-limited and equalized results (the signal through the upper path shown in FIG. 11), the digital signal LMEQ_Output is generated. The upper path causes a certain delay, so that some delay units are required in the lower path, and in this embodiment, the delay amount is equal to 3 sampling periods.

Figure 12:
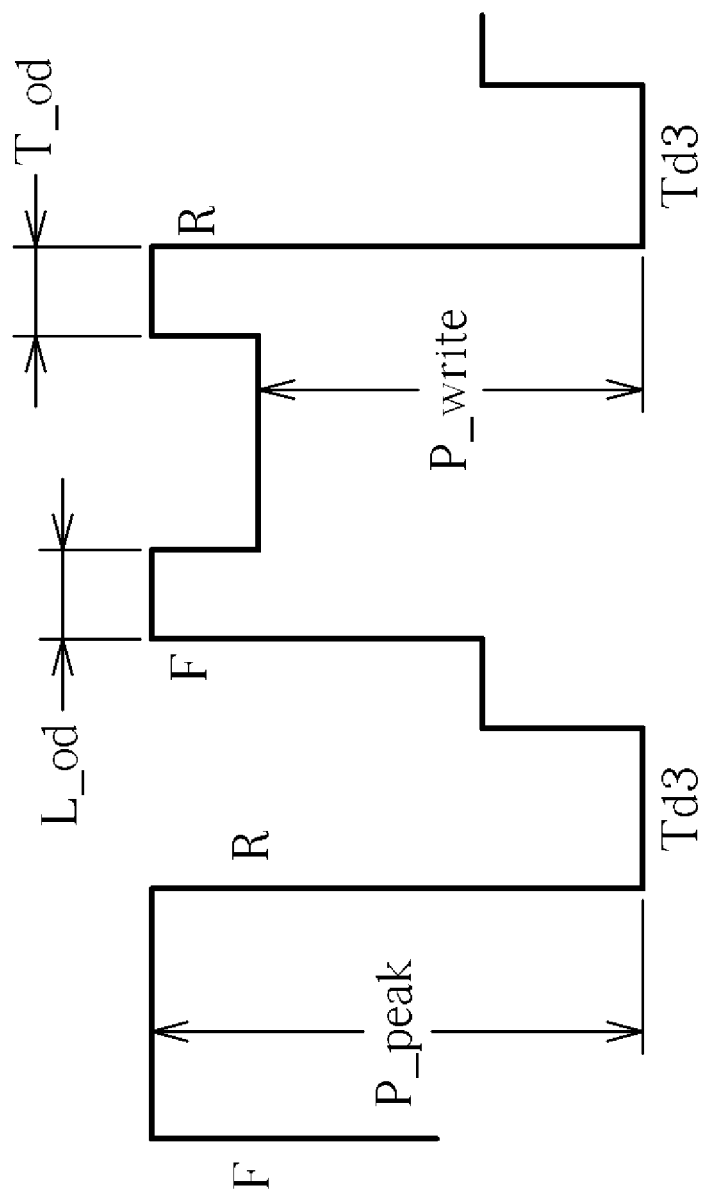
FIG. 12 illustrates some write strategy parameters of write pulses, where the write pulses complies with a castle write strategy according to an embodiment of the present invention.

Please refer to FIG. 12. FIG. 12 illustrates some of the write strategy parameters of write pulses, where the write pulses complies with a castle write strategy in this embodiment. The peak power level P_peak mentioned above is substantially the height of a write pulse of minimum multiple of T (i.e., 3T in this embodiment) with respect to a base level. In addition, the write power level P_write mentioned above is substantially the height of a middle portion of a write pulse of other multiples of T (i.e., 4T or above in this embodiment) with respect to the base level. As shown in FIG. 12, L_od and T_od respectively represent the OD widths beside the middle portion, where the OD width L_od is the duration of the leading OD portion with the peak power level P_peak, and the OD width T_od is the duration of the trailing OD portion with the peak power level P_peak. Comparing with tuning the write strategy parameters F and R to control the front edge delay and the rear edge delay of a write pulse corresponding to a pit (e.g., the method performed as shown in FIG. 3), tuning at least one of some other write strategy parameters such as the OD widths L_od and T_od, and power levels comprising the peak power level P_peak and the write power level P_write can be implemented according to different embodiments of the present invention.

According to an embodiment for tuning at least one OD width, $L\_od_{n,m}$ represents the OD width L_od corresponding to the data type $P_{mT}$ of the data set type $(L_{nT}, P_{mT})$. Replacing the write strategy parameter F with the OD width L_od in the following equation:

$$dF_{i,k} = G_{i,k,L} * \Delta L_{nT} - G_{i,k,P} * \Delta P_{mT};$$

where the combination index i represents the combinations (n, m), a new equation for this embodiment is derived as follows:

$$dL\_od_{n,m,k} = G_{n,m,k,L} * \Delta L_{nT} - G_{n,m,k,P} * \Delta P_{mT};$$

where if the average land error $\Delta L_{nT}$ is greater than the average pit error $\Delta P_{mT}$ in the data set type $(L_{nT}, P_{mT})$, the OD width $L\_od_{n,m}$ should be increased. In addition, if the average land error $\Delta L_{nT}$ is less than the average pit error $\Delta P_{mT}$ in the data set type $(L_{nT}, P_{mT})$, the OD width $L\_od_{n,m}$ should be decreased. Accordingly, the MPU mentioned above or the WSR tuning module 430 may tune the OD width $L\_od_{n,m,k}$ according to the following equation:

$$L\_od_{n,m,k+1} = L\_od_{n,m,k} + dL\_od_{n,m,k}.$$

Similarly, $T\_od_{n,m}$ represents the OD width T_od corresponding to the data type $P_{nT}$ of the data set type $(P_{nT}, L_{mT})$. Replacing the write strategy parameter R with the OD width T_od in the following equation:

$$dR_{j,k} = H_{j,k,P} * \Delta P_{nT} - H_{j,k,L} * \Delta L_{mT};$$

where the combination index j represents the combinations (n, m), another new equation for this embodiment is derived as follows:

$$dT\_od_{n,m,k} = -(H_{n,m,k,P} * \Delta P_{nT} - H_{n,m,k,L} * \Delta L_{mT});$$

where if the average land error $\Delta L_{nT}$ is less than the average pit error $\Delta P_{mT}$ in the data set type $(P_{nT}, L_{mT})$, the OD width $T\_od_{n,m}$ should be decreased. In addition, if the average land error $\Delta L_{nT}$ is greater than the average pit error $\Delta P_{mT}$ in the data set type $(P_{nT}, L_{mT})$, the OD width $T\_od_{n,m}$ should be increased. Accordingly, the MPU or the WSR tuning module 430 may tune the OD width $T\_od_{n,m,k}$ according to the following equation:

$$T\_od_{n,m,k+1} = T\_od_{n,m,k} + dT\_od_{n,m,k}.$$

According to a variation of this embodiment, the freedom of tuning of the OD widths is limited to being related to the pit lengths only, i.e., the lengths of the adjacent lands are not considered, the OD width L_od corresponding to the data type $P_{mT}$ can be tuned according to the following equations:

$$dL\_od_{m,k} = \sum_n (G_{n,m,k,L} * \Delta L_{nT} - G_{n,m,k,P} * \Delta P_{mT}); \text{ and}$$

$$L\_od_{m,k+1} = L\_od_{m,k} + dL\_od_{m,k}.$$

Similarly, the OD width T_od corresponding to the data type $P_{nT}$ can be tuned according to the following equations:

$$dT\_od_{n,k} = \sum_{m} -(H_{n,m,k,P} * \Delta P_{nT} - H_{n,m,k,L} * \Delta L_{mT}); \text{ and}$$

$$T\_od_{n,k+1} = T\_od_{n,k} + dT\_od_{n,k}.$$

According to a variation of this embodiment, the freedom of tuning of the OD widths is limited to being related to the pit lengths only, i.e., the lengths of the adjacent lands are not considered, the OD width L_od corresponding to the data type $P_{mT}$ can be tuned according to the following equations:

$$dL\_od_{m,k} = -G_{m,k,P} * \Delta P_{mT}; \text{ and}$$

$$L\_od_{m,k+1} = L\_od_{m,k} + dL\_od_{m,k}.$$

In this variation, $\Delta P_{mT}$ is redefined as the average of pit length errors, where each pit length error is obtained by subtracting a target length from a pit length. Accordingly, $\Delta P_{mT}$ can be expressed according to the following equation:

$$\Delta P_{mT} = \underset{(m-0.5)T<P<(m+0.5)T}{Avg} (P-mT).$$

Similarly, the OD width T_od corresponding to the data type $P_{nT}$ can be tuned according to the following equations:

$$dT\_od_{n,k} = -H_{n,k,P} * \Delta P_{nT}; \text{ and}$$

$$T\_od_{n,k+1} = T\_od_{n,k} + dT\_od_{n,k}.$$

According to another variation of this embodiment, the freedom of tuning of the OD widths is limited to being related to the land lengths only, i.e., the lengths of the adjacent pits are not considered. Similar descriptions are not repeated in detail here.

Please refer to FIG. 12 again. According to another embodiment, the calculation results derived from the lengths are utilized for tuning the power ratio R_p, or at least one power level such as the peak power level P_peak or the write power level P_write, where the power ratio R_p is the ratio of write power over peak power as mentioned, and can be tuned according to the following equation:

$$dR\_p = -(G_{z,P} * \Delta P_{zT})$$

where zT is the minimum multiple of T (i.e., 3T in this embodiment). If the average length $P_{zT}$ of the lengths corresponding to the data type $P_{zT}$ is not long enough, for example, a difference between the average length $P_{zT}$ and the minimum multiple zT is greater than a predetermined threshold, it is reasonable to increase the peak power level P_peak in order to increase the average length $P_{zT}$ after tuning the power ratio R_p by tuning the peak power level P_peak for the data type $P_{zT}$. On the other hand, regarding one of the other multiples of T (i.e., 4T or above in this embodiment), the power ratio R_p is decreased while the peak power level P_peak is increased. In order to keep an average power value of the whole write pulse (including the OD portions and the middle portion) to be substantially constant or within a specific range, the write power level P_write should be decreased in this situation.

Similarly, if the average length $P_{zT}$ of the lengths corresponding to the data type $P_{zT}$ is too long enough, for example, a difference between the average length $P_{zT}$ and the minimum multiple zT is less than a predetermined threshold, it is reasonable to decrease the peak power level P_peak in order to decrease the average length $P_{zT}$ after tuning the power ratio R_p by tuning the peak power level P_peak for the data type $P_{zT}$. On the other hand, regarding one of the other multiples of a period of a data clock T (i.e., 4T or above in this embodiment), the power ratio R_p is increased while the peak power level P_peak is decreased. In order to keep an average power value of the whole write pulse (including the OD portions and the middle portion) to be substantially constant or within a specific range, the write power level P_write should be increased in this situation.

In general, tuning the power ratio R_p can be achieved by tuning the peak power level P_peak and/or the write power level P_write according to the following equations:

$$P\_peak_{k+1} = P\_peak_k + G\_peak * dR\_p_k; \text{ and}$$

$$P\_write_{k+1} = P\_write_k + G\_write * dR\_p_k;$$

where G_peak and G_write are gain factors for controlling the tuning speed of each iteration, and k is the loop index as mentioned. Typically, if dR_p is greater than 0, the peak power level P_peak is increased and the write power level P_write is decreased. In addition, if dR_p is less than 0, the peak power level P_peak is decreased and the write power level P_write is increased.

Figure 13:
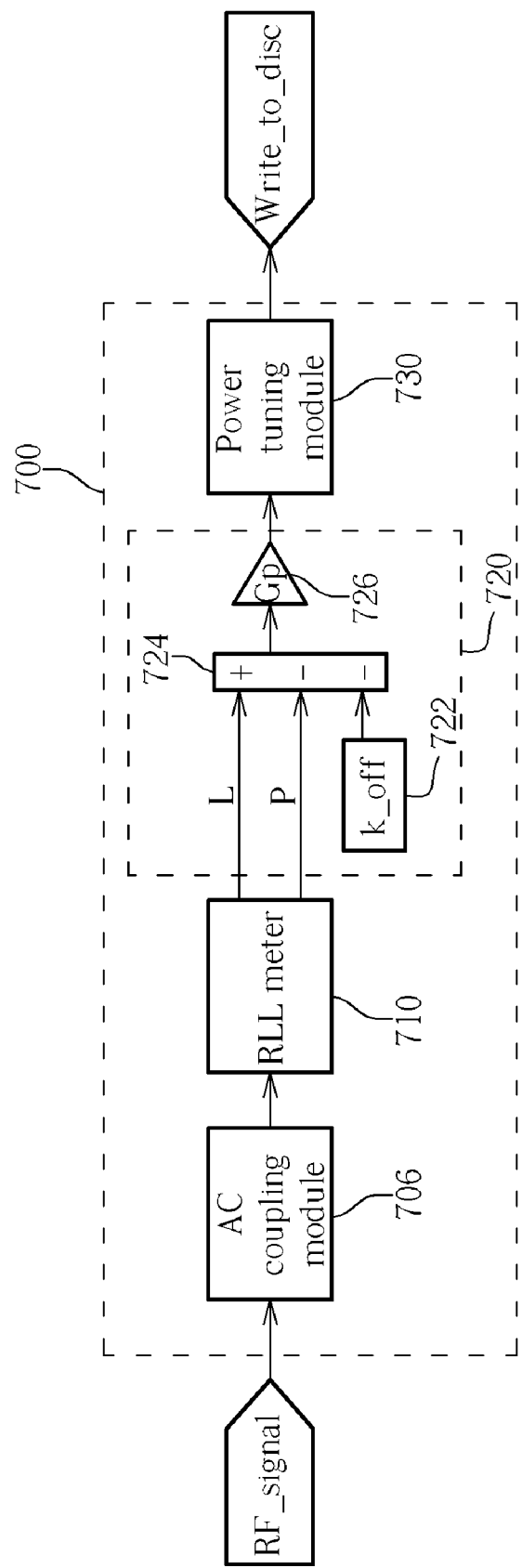
FIG. 13 is a diagram of a system for tuning write strategy parameters of an optical storage device according to an embodiment of the present invention.

Please refer to FIG. 13. FIG. 13 is a diagram of a system 700 for tuning write strategy parameters of an optical storage device according to an embodiment of the present invention. In this embodiment, the system 700 comprises an alternating current (AC) coupling module 706, an RLL meter 710, a calculation module 720, and a power tuning module 730, where the calculation module 720 comprises a level generator 722, an addition/subtraction unit 724, and an amplifier 726. The AC coupling module 706 is utilized for AC-coupling the RLL meter 710 to the RF signal RF_signal. The operation principles of the RLL meter 710 are similar to those of the RLL meter 410 shown in FIG. 6. The level generator 722 is utilized for generating a level k_off, which represents an offset value for calculations perform by the calculation module 720. The addition/subtraction unit 724 performs addition/subtraction operations on the land lengths L, the pit lengths P, and the level k_off, and output the operation result(s) into the amplifier 726 for multiplying a gain factor Gp. As a result, the power tuning module 730 tunes the write strategy parameters such as at least one power level or the power ratio R_p, and generates the write signal Write_to_disc mentioned above according to the write strategy parameters.

According to this embodiment, if the overall average land length L is longer than the overall average pit length P, the overall power P_all should be increased to balance the overall average land length L and the overall average pit length P. The overall power P_all can be tuned according to the following equation:

$$dP\_all = \sum_{n} G_n * (\Delta L_{nT} - \Delta P_{nT}).$$

According to this equation, if the overall summation/average of the average land error $\Delta L_{nT}$ is greater than the overall summation/average of the average pit error $\Delta P_{nT}$, then the overall power P_all should be increased. In addition, if the overall summation/average of the average land error $\Delta L_{nT}$ is less than the overall summation/average of the average pit error $\Delta P_{nT}$, then the overall power P_all should be decreased.

In a variation of this embodiment, the overall power P_all can be tuned according to the following equation:

$$dP\_all = \sum_n G_n * (L_{nT} - P_{nT}).$$

According to this equation, if the overall summation/average of the average land length $L_{nT}$ is greater than the overall summation/average of the average pit length $P_{nT}$, the overall power P_all should be increase to increase the pit lengths. In addition, if the overall summation/average of the average land length $L_{nT}$ is less than the overall summation/average of the average pit length $P_{nT}$, the overall power P_all should be decrease to decrease the pit lengths.

Figure 14:
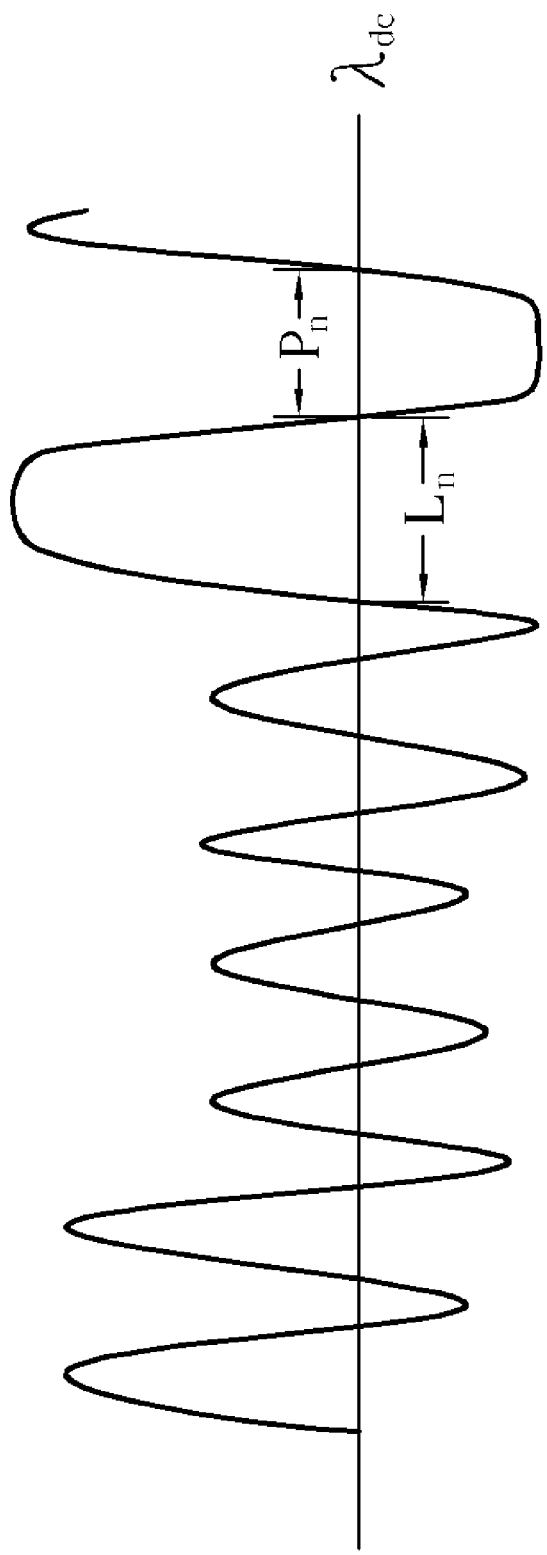
FIG. 14 illustrates a direct current (DC) level of a reproduced signal.

Please refer to FIG. 14. FIG. 14 illustrates a direct current (DC) level $\lambda_{dc}$ of the RF signal RF_signal. According to the situation shown in FIG. 14, the AC-coupled RF signal has a longer land length $L_n$ in contrast to a pit length $P_n$, and even has a longer average land length $L_n$ in contrast to an average pit length $L_n$. In this situation, the overall power P_all should be increased.

In some cases, the optimum overall power is corresponding to a non-zero offset such as an offset having the same level as the level k_off. The land lengths and the pit lengths are obtained by adding/subtracting the level k_off in calculations performed by the calculation module 720 to finding the optimum overall power. For example, by setting the target average power corresponding to the level k_off as follows:

$$dP\_all = \sum_n G_n * (\Delta L_n - \Delta P_n - \text{k\_off}); \text{ or}$$

$$dP\_all = \sum_n G_n * (L_n - P_n - \text{k\_off}).$$

It should be noted that the present invention can be implemented by means of hardware including a plurality of distinct elements, or by means of a suitably programmed computer. In the system claim enumerating a plurality of means, several of these means can be embodied by one and the same item of hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for tuning a plurality of write strategy parameters of an optical storage device, the method comprising:
   detecting a plurality of lengths, each length corresponding to a pit or a land on an optical storage medium accessed by the optical storage device;
   performing calculations according to the lengths and a plurality of data types to generate a plurality of calculation results respectively corresponding to the data types, each of the data types corresponding to at least a specific target pit length or at least a specific target land length; and
   utilizing the calculation results for tuning the write strategy parameters respectively corresponding to the data types, the write strategy parameters comprising one or more power levels of at least one write pulse corresponding to one or more data types.

2. The method of claim 1, wherein in the step of utilizing the calculation results, the calculation results are utilized for tuning the write strategy parameters comprising at least two power levels of the write pulse.

3. The method of claim 1, wherein in the step of utilizing the calculation results, the write pulse complies with a castle write strategy, and the calculation results are utilized for tuning the write strategy parameters comprising a write power level of the write pulse.

4. The method of claim 1, wherein in the step of utilizing the calculation results, the write pulse complies with a castle write strategy, and the calculation results are utilized for tuning the write strategy parameters comprising a peak power level of the write pulse.

5. The method of claim 1, wherein in the step of utilizing the calculation results, the write pulse complies with a castle write strategy, and the method further comprises:
   utilizing the calculation results corresponding to a data type of pits and of a minimum multiple of T (T is a period of a data clock), to tune the write strategy parameters comprising a peak power level of the write pulse.

6. A method for tuning a plurality of write strategy parameters of an optical storage device, the method comprising:
   detecting a plurality of lengths, each length corresponding to a pit or a land on an optical storage medium accessed by the optical storage device;
   performing calculations according to the lengths and a plurality of data types to generate a plurality of calculation results respectively corresponding to the data types, each of the data types corresponding to at least a specific target pit length or at least a specific target land length; and
   utilizing the calculation results for tuning the write strategy parameters respectively corresponding to the data types, the write strategy parameters comprising an overdrive (OD) width of at least one write pulse corresponding to one or more data types.

7. The method of claim 6, wherein in the step of utilizing the calculation results, the write pulse complies with a castle write strategy.

8. A method for tuning a plurality of write strategy parameters of an optical storage device, the method comprising:
   detecting a plurality of lengths comprising pit lengths and land lengths, each pit length corresponding to a pit on an optical storage medium accessed by the optical storage device, each land length corresponding to a land on the optical storage medium;
   performing calculations on the pit lengths and the land lengths of the plurality of lengths to generate a plurality of calculation results; and
   utilizing the calculation results for tuning the write strategy parameters comprising at least one power level, whereby an average power value is substantially kept constant or within a specific range.

9. The method of claim 8, wherein in the step of utilizing the calculation results, the power level is adjusted according to a difference between a pit length and a land length corresponding to the same target length.

10. The method of claim 8, wherein in the step of utilizing the calculation results, the power level is adjusted according to an average of a plurality of differences, and each of the differences is calculated by subtracting a land length from a pit length corresponding to the same target length.

11. The method of claim 8, wherein in the step of utilizing the calculation results, the power level is adjusted according to a difference between a pit length error and a land length error corresponding to the same target length.

12. The method of claim 8, wherein in the step of utilizing the calculation results, the power level is adjusted according to an average of a plurality of differences, and each of the differences is calculated by subtracting a land length error from a pit length error corresponding to the same target length.

13. A system for tuning a plurality of write strategy parameters of an optical storage device, the system comprising:
a run-length limited (RLL) meter for detecting a plurality of lengths, each length corresponding to a pit or a land on an optical storage medium accessed by the optical storage device;
a calculation module coupled to the RLL meter for performing calculations according to the lengths to generate a plurality of calculation results; and
a controller, coupled to the RLL meter and the calculation module, the controller utilizing the calculation results for tuning the write strategy parameters.

14. The system of claim 13, wherein the optical storage device generates an analog reproduced signal by accessing the optical storage medium, and the system further comprises:
an analog-to-digital converter (ADC) for converting the analog reproduced signal into a first digital signal;
wherein the RLL meter detects the lengths according to the first digital signal or a second digital signal corresponding to the first digital signal.

15. The system of claim 14, further comprises:
a limit equalizer (LMEQ) coupled between the ADC and the RLL meter for equalizing the first digital signal to generate the second digital signal;
wherein the RLL meter detects the lengths according to the second digital signal.

16. The system of claim 14, wherein the RLL meter detects a plurality of zero-crossing positions of the first digital signal or the second digital signal, and the RLL meter derives the lengths according to the zero-crossing positions.

17. The system of claim 16, wherein the plurality of zero-crossing positions are detected by utilizing an analytic method or a searching method.

18. The system of claim 13, wherein the calculation module performs calculations according to the lengths and a plurality of data types to generate a plurality of calculation results respectively corresponding to the data types, each of the data types corresponding to at least a specific target pit length or at least a specific target land length.

19. The system of claim 13, wherein the calculation module performs calculations according to the lengths and a plurality of data set types to generate a plurality of calculation results respectively corresponding to the data set types, each of the data set types corresponding to a combination of at least a specific target pit length and a specific target land length or a combination of at least a specific target land length and a specific target pit length, the combination corresponding to a specific write strategy parameter.

20. The system of claim 13, wherein the system is substantially the optical storage device.

21. The system of claim 13, wherein the system is a circuit positioned in the optical storage device, or the system is a circuit coupled to the optical storage device.

* * * * *